United States Patent
Zhong

(10) Patent No.: US 11,082,142 B2
(45) Date of Patent: Aug. 3, 2021

(54) TRANSMISSION RATE ADJUSTMENT METHOD AND NETWORK DEVICE

(71) Applicant: Huawei Technologies Co., Ltd., Shenzhen (CN)

(72) Inventor: Qiwen Zhong, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 23 days.

(21) Appl. No.: 16/428,246

(22) Filed: May 31, 2019

(65) Prior Publication Data

US 2019/0288783 A1  Sep. 19, 2019

Related U.S. Application Data

(63) Continuation of application No. PCT/CN2017/097999, filed on Aug. 18, 2017.

(30) Foreign Application Priority Data

Dec. 23, 2016 (CN) .......................... 201611205246.8

(51) Int. Cl.
*H04J 3/07* (2006.01)
*H04L 1/00* (2006.01)
*H04L 27/26* (2006.01)

(52) U.S. Cl.
CPC ............... *H04J 3/07* (2013.01); *H04L 1/00* (2013.01); *H04L 1/0008* (2013.01); *H04L 1/0071* (2013.01); *H04L 27/2666* (2013.01)

(58) Field of Classification Search
None
See application file for complete search history.

(56) References Cited

U.S. PATENT DOCUMENTS

| 7,656,905 B2 | 2/2010 | Seth et al. |
| 2003/0039252 A1* | 2/2003 | Gallassi ............. H04Q 11/0478 370/395.1 |

(Continued)

FOREIGN PATENT DOCUMENTS

| CN | 1521988 A | 8/2004 |
| CN | 1984043 A | 6/2007 |

(Continued)

OTHER PUBLICATIONS

"Flex Ethernet Implementation Agreement," Optical Internetworking Forum, IA# OIF-FLEXE-01.1, Jun. 21, 2017, 35 pages.

(Continued)

*Primary Examiner* — Andre Tacdiran
(74) *Attorney, Agent, or Firm* — Slater Matsil, LLP

(57) ABSTRACT

A transmission rate adjustment method and a network device, the method including obtaining, by a network device, a target data stream, where the target data stream includes a first data packet, and where the first data packet includes at least two non-idle units, and inserting or deleting a padding unit between two non-idle units of the at least two non-idle units, in response to bandwidth adjustment needing to be performed, and according to a value of the bandwidth adjustment that needs to be performed, where the padding unit provides adaption to a difference between a bandwidth of an upstream transmission channel of the network device and a bandwidth of a downstream transmission channel of the network device.

20 Claims, 17 Drawing Sheets

Min Buffer Size=MaxPacketLength×(OR−IR)/OR

(56) References Cited

U.S. PATENT DOCUMENTS

| | | | |
|---|---|---|---|
| 2004/0202205 A1* | 10/2004 | Sheth | H04J 3/07 370/539 |
| 2006/0123186 A1* | 6/2006 | Loh | G06F 9/30101 711/103 |
| 2007/0071033 A1* | 3/2007 | Surek | H04J 3/1611 370/474 |
| 2007/0076680 A1* | 4/2007 | Amram | H04L 1/0083 370/349 |
| 2008/0081575 A1* | 4/2008 | Mathew | H04L 1/0045 455/187.1 |
| 2010/0086300 A1* | 4/2010 | Jiang | H04J 3/1658 398/46 |
| 2016/0337725 A1* | 11/2016 | Graves | H04Q 11/0003 |

FOREIGN PATENT DOCUMENTS

| | | |
|---|---|---|
| CN | 101656588 A | 2/2010 |
| CN | 103546229 A | 1/2014 |
| JP | 2002223245 A | 8/2002 |
| JP | 2004208033 A | 7/2004 |
| JP | 2012517130 A | 7/2012 |

OTHER PUBLICATIONS

"IEEE Standard for Ethernet," IEEE Standards Association, IEEE Computer Society, Sponsored by LAN/MAN Standards Committee, IEEE Std 802.3-2015, Revision of IEEE Std 802.3-2012, 2015, 6 Sections, 4017 pages.

"Series G: Transmission Systems and Media, Digital Systems and Networks, Digital Terminal Equipments—General, Series Y: Global Information Infrastructure, Internet Protocol Aspects and Next-Generation Networks, Internet of Things and Smart Cities, Internet Protocol Aspect—Transport, Interfaces for the Optical Transport Network," International Telecommunication Union, ITU-T, G.709/Y.1331, Jun. 2016, 244 pages.

"Considerations on the Mapping of FlexE Client and Subrate Signals into OTN," Source: Huawei Technologies Co., Ltd., China Mobile Communications Corporation, Study Group 15-Contribution 1195, International Telecommunication Union, COM15-C, 1195-E, XP044136869, Jun. 2015, 13 pages.

* cited by examiner

| MII 8 octets with T/RXC | | | | | | | | 0 0 0 0 0 0 0 0<br>0 1 2 3 4 5 6 7 | 0 0<br>8 9 | 1 1 1 1 1 1<br>0 1 2 3 4 5 | 1 1 1 1 2 2<br>6 7 8 9 0 1 | 2 2 2 2 2 2<br>2 3 4 5 6 7 | 2 2 3 3 3 3<br>8 9 0 1 2 3 | 3 3 3 3 3 3<br>4 5 6 7 8 9 | 4 4 4 4 4 4<br>0 1 2 3 4 5 | 4 4 4 4 5 5<br>6 7 8 9 0 1 | 5 5 5 5 5 5<br>2 3 4 5 6 7 | 5 5 6 6 6 6<br>8 9 0 1 2 3 | 6 6<br>4 5 |
|---|---|---|---|---|---|---|---|---|---|---|---|---|---|---|---|---|---|---|---|
| D0 | D1 | D2 | D3 | D4 | D5 | D6 | D7 | D0 | 0 1 | D1 | D2 | D3 | D4 | D5 | D6 | D7 | | | |
| C0 | C1 | C2 | C3 | C4 | C5 | C6 | C7 | 0x1E | 1 0 | C0 | C1 | C2 | C3 | C4 | C5 | C6 | C7 | | |
| S0 | D1 | D2 | D3 | D4 | D5 | D6 | D7 | 0x78 | 1 0 | D1 | D2 | D3 | D4 | D5 | D6 | D7 | | | |
| O0 | D1 | C2 | C3 | C4 | C5 | C6 | C7 | 0x4B | 1 0 | D1 | C1 | C2 | C3 | C4 | C5 | C6 | C7 | | |
| T0 | C1 | C2 | C3 | C4 | C5 | C6 | C7 | 0x87 | 1 0 |  | C1 | C2 | O0 |  |  |  | C7 | | |
| D0 | T1 | C2 | C3 | C4 | C5 | C6 | C7 | 0x99 | 1 0 | D0 |  | C2 | C3 | C4 | C5 | C6 | C7 | | |
| D0 | D1 | T2 | C3 | C4 | C5 | C6 | C7 | 0xAA | 1 0 | D0 | D1 |  | C3 | C4 | C5 | C6 | C7 | | |
| D0 | D1 | D2 | T3 | C4 | C5 | C6 | C7 | 0xB4 | 1 0 | D0 | D1 | D2 |  | C4 | C5 | C6 | C7 | | |
| D0 | D1 | D2 | D3 | T4 | C5 | C6 | C7 | 0xCC | 1 0 | D0 | D1 | D2 | D3 |  | C5 | C6 | C7 | | |
| D0 | D1 | D2 | D3 | D4 | T5 | C6 | C7 | 0xD2 | 1 0 | D0 | D1 | D2 | D3 | D4 |  | C6 | C7 | | |
| D0 | D1 | D2 | D3 | D4 | D5 | T6 | C7 | 0xE1 | 1 0 | D0 | D1 | D2 | D3 | D4 | D5 |  | C7 | | |
| D0 | D1 | D2 | D3 | D4 | D5 | D6 | T7 | 0xFF | 1 0 | D0 | D1 | D2 | D3 | D4 | D5 | D6 | | | |
|  |  |  |  |  |  |  |  | Reserved | 1 0 | R R R R R R | R R R R R R | R R R R R R | R R R R R R | R R R R R R | R R R R R R | R R R R R R | R R R R R R | R R R R R R | R R |

FIG. 4

| 0 0 0 0 0 0 0 0 0 0 1 1 1 1 1 1 1 1 1 1 2 2 2 2 2 3 4 5 6 7 8 9 | /1/ or /LP1/ | /1/ or /LP1/ | /1/ or /LP1/ | /1/ or /LP1/ | /1/ or /LP1/ | /1/ or /LP1/ | /1/ or /LP1/ | /1/ or /LP1/ | |
|---|---|---|---|---|---|---|---|---|---|
| 1 0 | 0x1E | /1/ (0x00) | /1/ (0x00) | /1/ (0x00) | /1/ (0x00) | /1/ (0x00) | /1/ (0x00) | /1/ (0x00) | /1/ (0x00) | Broad-sense IDLE |
| 1 0 | 0x1E | /1/ (0x00) | /1/ (0x00) | /1/ (0x00) | /1/ (0x00) | /1/ (0x00) | /1/ (0x00) | /1/ (0x00) | /1/ (0x00) | Narrow-sense IDLE |
| 1 0 | 0x1E | /LPI/ (0x06) | /LPI/ (0x06) | /LPI/ (0x06) | /LPI/ (0x06) | /LPI/ (0x06) | /LPI/ (0x06) | /LPI/ (0x06) | /LPI/ (0x06) | LPI IDLE |
| 1 0 | 0x1E | /E/ (0x1E) | /E/ (0x1E) | /E/ (0x1E) | /E/ (0x1E) | /E/ (0x1E) | /E/ (0x1E) | /E/ (0x1E) | /E/ (0x1E) | Error |
| 1 0 | 0x4B | D1 | D2 | D3 | 0x0 | C4 | C5 | C6 | C7 | Sequence ordered set |
| 1 0 | 0x4B | D1 | D2 | D3 | 0xF | C4 | C5 | C6 | C7 | Signal ordered set |
| 1 0 | 0x4B | D1 | D2 | D3 | 0x5 | 0x000_0000 | | | | FlexE frame header |

FIG. 5

| 0000000000111111111122222222223333333333444444444455555555556666666 | | | | | | | | |
|---|---|---|---|---|---|---|---|---|
| 0123456789012345678901234567890123456789012345678901234567890123456 | | | | | | | | |
| 10 | 0x00 | /I/ (0x00) | /I/ (0x00) | /I/ (0x00) | /I/ (0x00) | /I/ (0x00) | /I/ (0x00) | /I/ (0x00) |
| 10 | 0x1E | /Pad/ (0x55) | /Pad/ (0x55) | /Pad/ (0x55) | /Pad/ (0x55) | /Pad/ (0x55) | /Pad/ (0x55) | /Pad/ (0x55) |
| 10 | 0x4B | 0x00 | 0x00 | 0x00 | 0xA | 0x000_0000 | | |

FIG. 6

| Control character | Notation | XLGMII/CGMII control code | 40/100GBASE-R O code | 40GBASE-R and 100GBASE-R control code |
|---|---|---|---|---|
| Idle | /I/ | 0x07 | | 0x00 |
| LPI | /LI/ | 0x06 | | 0x06 |
| Start | /S/ | 0xFB | | Encoded by block type field |
| Terminate | /T/ | 0xFD | | Encoded by block type field |
| Error | /E/ | 0xFE | | 0x1E |
| Sequence ordered set | /Q/ | 0x9C | 0x0 | Encoded by block type 0x4B plus O code, control codes are set to 0x00 |
| Signal ordered set[a] | /Fsig/ | 0x5C | 0xF | Encoded by block type 0x4B plus O code, control codes are set to 0x00 |

FIG. 9

| CPRI physical interface option | Information data rate | Line coding | Line transmission data rate |
|---|---|---|---|
| CPRI line bit rate option 1 | 1x491.52 Mbit/s | 8B/10B line coding | 1x491.52x10/8 = 614.4 Mbit/s |
| CPRI line bit rate option 2 | 2x491.52 Mbit/s | 8B/10B line coding | 2x491.52x10/8 = 1228.8 Mbit/s |
| CPRI line bit rate option 3 | 4x491.52 Mbit/s | 8B/10B line coding | 4x491.52x10/8 = 2457.6 Mbit/s |
| CPRI line bit rate option 4 | 5x491.52 Mbit/s | 8B/10B line coding | 5x491.52x10/8 = 3072.0 Mbit/s |
| CPRI line bit rate option 5 | 8x491.52 Mbit/s | 8B/10B line coding | 8x491.52x10/8 = 4915.2 Mbit/s |
| CPRI line bit rate option 6 | 10x491.52 Mbit/s | 8B/10B line coding | 10x491.52x10/8 = 6144.0 Mbit/s |
| CPRI line bit rate option 7 | 16x491.52 Mbit/s | 8B/10B line coding | 16x491.52x10/8 = 9830.4 Mbit/s |
| CPRI line bit rate option 7A | 16x491.52 Mbit/s | 64B/66B line coding | 16x491.52x66/64 = 8110.08 Mbit/s |
| CPRI line bit rate option 8 | 20x491.52 Mbit/s | 64B/66B line coding | 20x491.52x66/64 = 10137.6 Mbit/s |
| CPRI line bit rate option 9 | 24x491.52 Mbit/s | 64B/66B line coding | 24x491.52x66/64 = 12165.12 Mbit/s |

FIG. 13

TRANSMISSION RATE ADJUSTMENT METHOD AND NETWORK DEVICE

CROSS-REFERENCE TO RELATED APPLICATIONS

This application is a continuation of International Application No. PCT/CN2017/097999, filed on Aug. 18, 2017, which claims priority to Chinese Patent Application No. 201611205246.8, filed on Dec. 23, 2016, both of which are hereby incorporated by reference in their entireties.

TECHNICAL FIELD

This application relates to the field of communications technologies, and in particular, to a transmission rate adjustment method and a network device.

BACKGROUND

In a flexible Ethernet (FlexE), with reference to synchronous digital hierarchy or optical transport network (SDH/OTN) technologies, a FlexE frame format is constructed for information transmission on each physical interface in a flexible Ethernet link group FlexE group, and time division multiplexing (TDM) timeslot division is performed. Different from SDH/OTN byte interleaving, a TDM timeslot division granularity of the FlexE is 66 bits, and interleaving between timeslots is performed at an interval of 66 bits. For example, for a 100-GE physical interface, a FlexE frame includes eight rows, a location of a first 66b block in each row is a FlexE overhead area, and a payload area for timeslot division follows the overhead area. A FlexE frame uses a 64/66b bit block as a granularity, is corresponding to 20×1023 64/66b bit block bearer spaces, and is divided into 20 timeslots. A bandwidth of each timeslot is approximately 5 Gbps (approximately a bandwidth of a 100-GE interface divided by 20), and a nominal rate is less than 5 Gbps.

The FlexE frame is transmitted by using a load capability of a physical interface. Therefore, an actual rate of a FlexE service timeslot is constrained by a rate characteristic of the physical interface. For example, an encoded rate of the 100-GE physical interface is 66/64×100 Gbps=103.125 Gbps, and a physical interface rate deviation of the 100-GE physical interface is +/−100 ppm. In this case, the actual rate is 103.125 Gbps+/−100 ppm. A bandwidth of a multi-channel align code block (1/16384) further needs to be removed from that of an existing multi-channel parallel 100-GE Ethernet interface. Therefore, a bit rate of a 100 G FlexE frame is (16383/16384)×(66/64)×100 Gbps+/−100 ppm, and a total rate of a payload area of the 100 G FlexE frame is ((1023×20)/(1023×20+1))×(16383/16384)×(66/64)×100 Gbps+/−100 ppm. A rate of each timeslot is ((1023×1)/(1023×20+1))×(16383/16384)×(66/64)×100 Gbps+/−100 ppm, which is different from (66/64)×5 Gbps+/−100 ppm.

In the FlexE, several physical interfaces are allowed to be cascaded and bundled to form a flexible Ethernet link group FlexE group, and all timeslots of the FlexE group may be combined to form several transmission channels for bearing several Ethernet services. For example, two timeslots are combined to form one transmission channel for bearing a 10-GE service, five timeslots are combined to form one transmission channel for bearing a 25-GE service, and 30 timeslots are combined to form one transmission channel for bearing a 150-GE service. A service borne on a transmission channel is a specified sequentially-transmitted 66b code block. The 66b code block is consistent with an original 64/66b code block stream generated after an Ethernet MAC data stream is encoded. It should be noted that a typical encoded rate of the service such as a 50-GE service is (66/64)×50 Gbps+/−100 ppm. Idle addition or deletion needs to be performed to implement adaptation to a transmission rate of a transmission channel formed by combining timeslots in the flexible Ethernet link group FlexE group. The idle addition or deletion is mainly adjusting a quantity of idle bytes between Ethernet groups and a quantity of 64/66b code blocks (eight idle bytes) corresponding to the idle bytes.

In an existing IEEE 802.3 idle adjustment mechanism, no idle byte is allowed to exist between data bytes corresponding to a data packet, and no idle code block is allowed to exist between encoded data code blocks. In this case, a system needs to buffer a data packet or 64/66b code blocks of a quantity corresponding to the data packet, to adapt to a case in which a relatively large difference exists between a rate of a service in an upstream bearer transmission channel of a node and a rate of the service in a downstream bearer transmission channel of the node. The FlexE directly uses the IEEE 802.3 idle adjustment mechanism to implement service rate adjustment and adaptation. For example, bandwidths and quantities of timeslots of bearer transmission channels of a service on upstream and downstream FlexE interfaces of a network node are adjusted/increased. When a large difference exists between an upstream data input rate and a downstream data output rate, substantial data buffers need to be used. Consequently, device complexity and a transmission delay are increased. Currently, this idle addition or deletion rate adjustment mechanism is also applied to an OTN to implement mapping and adaptation from a service to an ODUflex. In this case, the OTN also directly uses the IEEE 802.3 idle adjustment mechanism to implement service rate adjustment and adaptation and map the service to the ODUflex. However, only a mechanism for slowly adjusting a bandwidth of the ODUflex serving as a bearer transmission channel can be used, to ensure that the service is lossless.

SUMMARY

Embodiments of the present application provide a transmission rate adjustment method, to perform efficient idle addition or deletion-based rate adjustment on a network node based on a difference between rates of upstream and downstream transmission channels of a service data stream, to adapt to different cases of the difference between the rates of the upstream and downstream transmission channels of a service, especially a case in which there is a relatively large difference between the rates of the upstream and downstream transmission channels when rapid adjustment is performed on an end-to-end transmission bandwidth of the service. In addition, a network node data buffer, a network node processing delay, and an end-to-end service transmission delay are reduced.

A first aspect of the embodiments of the present application provides a transmission rate adjustment method, including obtaining, by a network device from an upstream device, a target data stream that includes a first data packet, where the first data packet includes at least two non-idle units, and when bandwidth adjustment needs to be performed, inserting or deleting a padding unit between any two non-idle units based on a value of the bandwidth adjustment that needs to be performed, where the padding unit is used to adapt to a difference between a bandwidth of an upstream transmission channel of the network device and a bandwidth of a downstream transmission channel of the network device, and the difference between the bandwidths is the value of the bandwidth adjustment that needs to be performed. In the embodiments of the present application, the padding unit is inserted between the non-idle units to implement rapid stepped transmission rate adjustment.

With reference to the first aspect of the embodiments of the present application, in a first implementation of the first aspect of the embodiments of the present application, after the obtaining, by a network device, a target data stream, the method further includes when bandwidth adjustment needs to be performed, inserting or deleting the padding unit between the first data packet and an adjacent data packet of the first data packet based on the value of the bandwidth adjustment that needs to be performed, where the padding unit is used to adapt to the difference between the bandwidth of the upstream transmission channel of the network device and the bandwidth of the downstream transmission channel of the network device, and the difference between the bandwidths is the value of the bandwidth adjustment that needs to be performed. In the embodiments of the present application, the padding unit is inserted between data packets to implement rapid stepped transmission rate adjustment.

With reference to the first aspect of the embodiments of the present application, in a second implementation of the first aspect of the embodiments of the present application, the inserting or deleting a padding unit between any two non-idle units based on a value of the bandwidth adjustment that needs to be performed includes inserting or deleting a preset padding code block between any two non-idle units based on the value of the bandwidth adjustment that needs to be performed, where the preset padding code block is indicated by a code block type field, the preset padding code block is used to adapt to the difference between the bandwidth of the upstream transmission channel of the network device and the bandwidth of the downstream transmission channel of the network device, and the difference between the bandwidths is the value of the bandwidth adjustment that needs to be performed. As specifically described in the embodiments of the present application, the inserted or deleted padding unit is the preset padding code block, increasing feasibility of the embodiments of the present application.

With reference to the first aspect of the embodiments of the present application, in a third implementation of the first aspect of the embodiments of the present application, the inserting or deleting a padding unit between any two non-idle units based on a value of the bandwidth adjustment that needs to be performed includes inserting or deleting a typical idle code block between any two non-idle units based on the value of the bandwidth adjustment that needs to be performed, where the typical idle code block is indicated by a code block type field, the typical idle code block is used to adapt to the difference between the bandwidth of the upstream transmission channel of the network device and the bandwidth of the downstream transmission channel of the network device, and the difference between the bandwidths is the value of the bandwidth adjustment that needs to be performed. As specifically described in the embodiments of the present application, the inserted or deleted padding unit is the typical idle code block, increasing feasibility of the embodiments of the present application.

With reference to any one of the first aspect to the third implementation of the first aspect of the embodiments of the present application, in a fourth implementation of the first aspect of the embodiments of the present application, after the obtaining, by a network device, a target data stream, the method further includes when a rate difference for rate adaptation is less than the difference between the bandwidths, inserting or deleting a padding unit in the target data stream based on the rate difference required for the rate adaptation, where the inserted or deleted padding unit is used to perform rate adaptation. As described in the embodiments of the present application, a padding unit is inserted or deleted during slight adjustment on a transmission rate, so that rate adjustment manners in the embodiments of the present application are more diverse.

With reference to any one of the first aspect to the third implementation of the first aspect of the embodiments of the present application, in a fifth implementation of the first aspect of the embodiments of the present application, after the obtaining, by a network device, a target data stream, the method further includes deleting the padding unit, and sending, to a next network device or user equipment, a data unit that remains after the deletion. As described in the embodiments of the present application, all padding units and idle units are deleted, and only a data unit is sent to the next device, increasing feasibility and operability of the embodiments of the present application.

A second aspect of the embodiments of the present application provides a network device, including an obtaining unit, configured to obtain a target data stream, where the target data stream includes a first data packet, and the first data packet includes at least two non-idle units, and a first adjustment unit, configured to when bandwidth adjustment needs to be performed, insert or delete a padding unit between any two non-idle units based on a value of the bandwidth adjustment that needs to be performed, where the padding unit is used to adapt to a difference between a bandwidth of an upstream transmission channel of the network device and a bandwidth of a downstream transmission channel of the network device. In the embodiments of the present application, the padding unit is inserted between the non-idle units to implement rapid stepped transmission rate adjustment.

With reference to the second aspect of the embodiments of the present application, in a first implementation of the second aspect of the embodiments of the present application, the network device further includes a second adjustment unit, configured to when bandwidth adjustment needs to be performed, insert or delete the padding unit between the first data packet and an adjacent data packet of the first data packet based on the value of the bandwidth adjustment that needs to be performed. In the embodiments of the present application, the padding unit is inserted between data packets to implement rapid stepped transmission rate adjustment.

With reference to the second aspect of the embodiments of the present application, in a second implementation of the second aspect of the embodiments of the present application, the first adjustment unit includes a first adjustment module, configured to insert or delete a preset padding code block between any two non-idle units based on the value of the bandwidth adjustment that needs to be performed, where the preset padding code block is indicated by a code block type field, and the preset padding code block is used to adapt to the difference between the bandwidth of the upstream transmission channel of the network device and the bandwidth of the downstream transmission channel of the network device. As specifically described in the embodiments of the present application, the inserted or deleted padding unit is the preset padding code block, increasing feasibility of the embodiments of the present application.

With reference to the second aspect of the embodiments of the present application, in a third implementation of the second aspect of the embodiments of the present application, the first adjustment unit includes a second adjustment module, configured to insert or delete a typical idle code block between any two non-idle units based on the value of the bandwidth adjustment that needs to be performed, where the typical idle code block is indicated by a code block type field, and the typical idle code block is used to adapt to the difference between the bandwidth of the upstream transmission channel of the network device and the bandwidth of the downstream transmission channel of the network device. As specifically described in the embodiments of the present application, the inserted or deleted padding unit is the typical idle code block, increasing feasibility of the embodiments of the present application.

With reference to any one of the second aspect to the third implementation of the second aspect of the embodiments of the present application, in a fourth implementation of the second aspect of the embodiments of the present application, the network device further includes a third adjustment unit, configured to insert or delete a padding unit in the target data stream based on a rate difference required for rate adaptation, where the inserted or deleted padding unit is used to perform rate adaptation, and the rate difference for the rate adaptation is less than the difference between the bandwidths. As described in the embodiments of the present application, a padding unit is inserted or deleted during slight adjustment on a transmission rate, so that rate adjustment manners in the embodiments of the present application are more diverse.

With reference to any one of the second aspect to the third implementation of the second aspect of the embodiments of the present application, in a fifth implementation of the second aspect of the embodiments of the present application, the network device further includes a processing unit, configured to delete the padding unit, and send, to a next network device or user equipment, a data unit that remains after the deletion. As described in the embodiments of the present application, all padding units and idle units are deleted, and only a data unit is sent to the next device, increasing feasibility and operability of the embodiments of the present application.

A third aspect of the embodiments of the present application provides a network device. The network device includes an input interface, an output interface, a processor, a memory, and a bus. The input interface, the output interface, the processor, and the memory are connected by using the bus. The input interface is configured to connect to an upstream device and obtain an input result. The output interface is configured to connect to a downstream device and output a result. The processor is configured to invoke a rate adjustment program from the memory, and execute the program. The memory is configured to store a received data stream and the rate adjustment program. The processor invokes a program instruction in the memory, so that the network device performs the transmission rate adjustment method according to any one of the first aspect to the fifth implementation of the first aspect.

It can be seen from the foregoing technical solutions that the embodiments of the present application have the following advantages.

In the technical solutions provided in the embodiments of the present application, the network device obtains the target data stream, where the target data stream includes the first data packet, and the first data packet includes at least two non-idle units, and when bandwidth adjustment needs to be performed, inserts or deletes the padding unit between any two non-idle units based on the value of the bandwidth adjustment that needs to be performed, where the padding unit is used to adapt to the difference between the bandwidth of the upstream transmission channel of the network device and the bandwidth of the downstream transmission channel of the network device. The embodiments of the present application can support rapid adjustment on transmission rates of a service in transmission channels on upstream and downstream interfaces of a network node, so that the service can adapt to a difference between transmission rates of the service in upstream and downstream transmission channels of the node, and a network node data buffer, a network node processing delay, and a service transmission delay are reduced.

BRIEF DESCRIPTION OF THE DRAWINGS

FIG. 4 is a schematic structural diagram of a code block in 64/66b encoding according to an embodiment of the present application.

FIG. 5 is a schematic structural diagram of a typical idle code block according to an embodiment of the present application;

FIG. 6 is a schematic structural diagram of a preset padding code block according to an embodiment of the present application;

FIG. 9 is a schematic structural diagram of a control code block according to an embodiment of the present application;

FIG. 13 is a schematic diagram of a plurality of physical interface options of a common public radio interface (CPRI) according to an embodiment of the present application;

DETAILED DESCRIPTION OF ILLUSTRATIVE EMBODIMENTS

Figure 1:
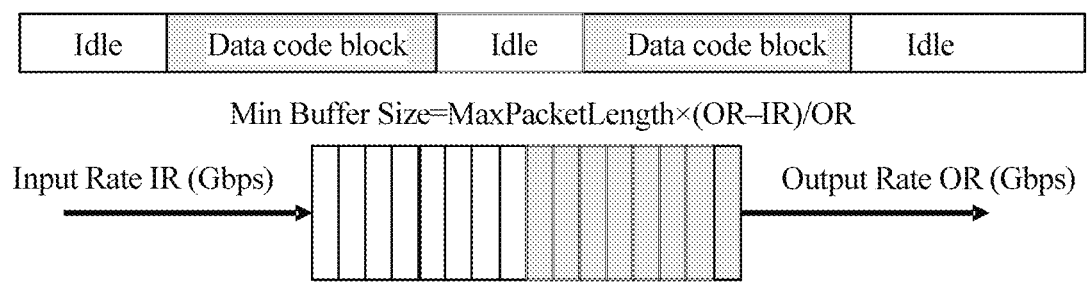
FIG. 1 is a schematic diagram of an IEEE 802.3 idle addition or deletion mechanism.

Embodiments of the present application provide a transmission rate adjustment method, to perform efficient idle addition or deletion-based rate adjustment on a network node based on a difference between rates of upstream and downstream transmission channels of a service data stream, to adapt to different cases of the difference between the rates of the upstream and downstream transmission channels of a service, especially a case in which there is a relatively large difference between the rates of the upstream and downstream transmission channels when rapid adjustment is performed on an end-to-end transmission bandwidth of the service. In addition, a network node data buffer, a network node processing delay, and an end-to-end service transmission delay are reduced.

To make persons skilled in the art better understand the solutions in the present application, the following describes the embodiments of the present application with reference to the accompanying drawings in the embodiments of the present application.

In the specification, claims, and accompanying drawings of the present application, the terms "first", "second", "third", "fourth", and so on (if any) are intended to distinguish between similar objects but do not necessarily indicate a specific order or sequence. It should be understood that the terms used in such a way are interchangeable in proper circumstances so that the embodiments described herein can be implemented in other orders than the order illustrated or described herein. Moreover, the term "include" or "contain" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, product, or device.

Currently, an IEEE 802.3 idle addition or deletion mechanism is used when a network node (namely, a network device) performs rate adjustment on a data stream that includes data code blocks, to adapt to a difference between transmission rates of upstream and downstream transmission channel bandwidths of the network node. When an upstream data input rate is far less than a downstream data output rate, no padding unit exists or is allowed to exist between the data code blocks included in the data stream. The network node needs to buffer the data stream that includes the data code blocks. An idle padding unit between corresponding data code block groups that belong to different data packets in the data stream is added or deleted, in other words, a padding unit is inserted or deleted. This almost needs to buffer a complete data packet. In addition, this IEEE 802.3-based idle addition or deletion mechanism is applicable to only implementing transmission rate adjustment when transmission adaptation is performed on a 64/66b encoded Ethernet service data stream on an interface, but is inapplicable to implementing transmission rate adjustment when transmission adaptation is performed on a data stream of a TDM service such as a common public radio interface (CPRI), an SDH, or an OTN, and a data stream of an Ethernet service (such as a GE service that uses 8b/10b encoding) that uses 64/66b encoding incompatible with 100 GE.

The CPRI typically has data streams in two encoding formats: 64/66b and 8b/10b. A CPRI service data stream in the 64/66b encoding format has only three 64/66b encoding code block types. A superframe structure with a length of 16×256×n bytes is encoded STD into three types of code blocks, namely, a start code block, a data code block, and a terminate code block. For example, a transmission rate is 12165.12 Mbit/s, a 64/66b encoding CPRI option 9 is used, n=24, and a superframe length is 16×256×24=98304 bytes. In this case, data of almost one complete superframe needs to be buffered to insert or delete an idle code block between superframes (similarly, between data packets), in other words, between the terminate code block and the start code block according to the IEEE 802.3 idle addition or deletion mechanism, to implement transmission rate adjustment. A CPRI data stream in the 8b/10b encoding format needs to be converted into that in the 64/66b encoding format. When a TDM service data stream including an SDH, an OTN, or the like without an encoding format is converted into that in the 64/66b encoding format, there may be only one type of code block, such as a data code block. In other words, a start code block and a terminate code block do not exist. Therefore, the existing IEEE 802.3 idle addition or deletion mechanism cannot be used to perform idle addition or deletion on an idle byte between a terminate code block and a start code block to implement rate adjustment.

When the existing IEEE 802.3 idle addition or deletion mechanism is applied to a FlexE system, the idle addition or deletion mechanism in the FlexE system is shown in FIG. 1. FIG. 1 is a schematic diagram of the IEEE 802.3 idle addition or deletion mechanism. As shown in FIG. 1, for example, when an output rate (OR) of a service in a downstream transmission channel of a node is 100 Gbps, and an input rate (IR) of the service in an upstream transmission channel of the node is 5 Gbps, the downstream output rate−the upstream input rate=OR−IR=100 Gbps−5 Gbps=95 Gbps. If Min Buffer Size=MaxPacketLength×(OR−IR)/OR, Min Buffer Size=0.95×76800=72960 bits= 72.96 kB. Buffering at least one longest frame is usually set in actual use. Longest frame jumbo frame size=9.6 kB=9.6× 8×1000=76800 bits, and transmission delay=Min Buffer Size/OR=768 ns to 1 μs. This requires the network node to be equipped with such a buffer capability for each service, thereby putting forward a high requirement on a device. A design with a small buffer capability is usually used in practice. Therefore, in the FlexE, service adjustment with a loss is allowed, to support stepped service bandwidth adjustment without expectation of introducing a design with a relatively large buffer.

When the IEEE 802.3 idle addition or deletion mechanism is applied to an OTN system, OTN ODUflex bandwidth adjustment emphasizes lossless service adjustment. Therefore, when a buffer capability of the network node is a fixed value, a speed of ODUflex bandwidth capacity adjustment is limited, and a bandwidth or a rate of an ODUflex serving as an upstream or downstream bearer transmission channel of a service needs to be increased or decreased very slowly. This manner is complicated and time-consuming, and is not conducive to rapid adjustment on a service bandwidth.

In addition to a FlexE in the Optical Internetworking Forum (OIF) and an OTN (G.709) in the International Telecommunication Union-Telecommunication Standardization Sector ITU-T, the embodiments of the present application may also be applied to a service type in which no idle byte exists in a service stream such as SDH/OTN, to implement service-to-interface transmission rate adjustment. The first two currently use the IEEE 802.3 idle addition or deletion mechanism, which is also referred to as an IMP mechanism in the OTN. Description of the IMP includes two aspects: service transmission rate adjustment and service-to-ODUflex mapping processing. Currently, lossless bandwidth adjustment of the ODUflex is slow adjustment with a small slope. After the embodiments of the present application are introduced, stepped and rapid lossless bandwidth adjustment (including an increase and a decrease) of the ODUflex with a large slope may be supported. An OIF FlexE currently uses stepped bandwidth adjustment, but has no lossless adjustment capability, in other words, a service impairment including a packet loss, a transient service interruption, and the like may be caused when a node buffer capability is limited. After the embodiments of the present application are introduced, there is no high data buffer requirement for the node, greatly reducing a complexity requirement for the node, and stepped lossless adjustment on a service bandwidth may be supported.

Figure 2:
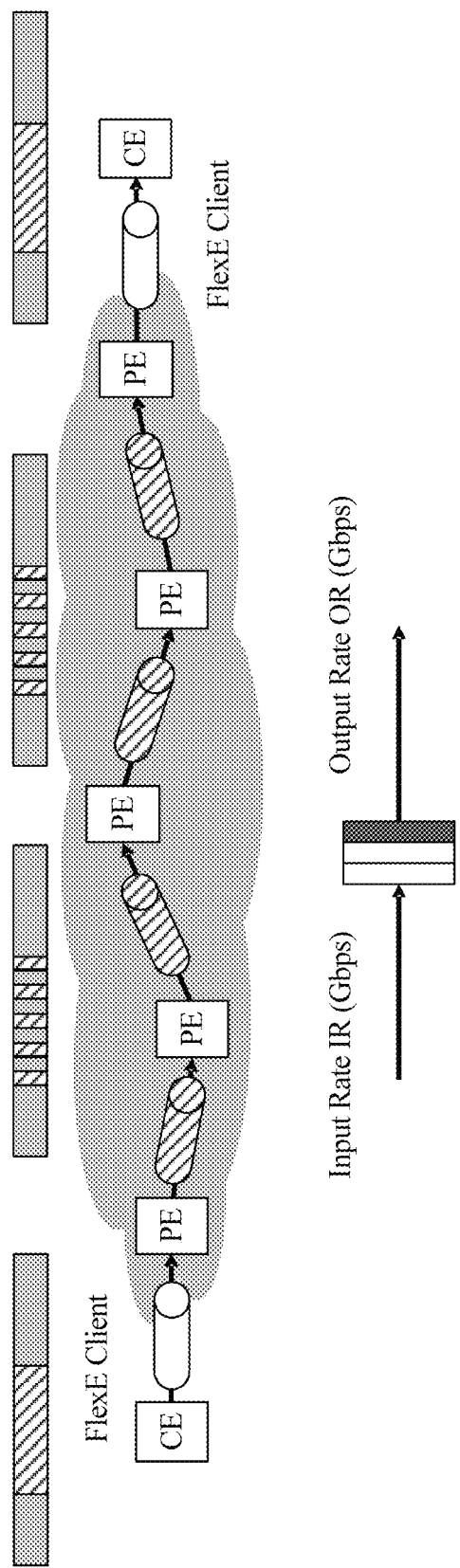
FIG. 2 is a schematic diagram of a network architecture according to an embodiment of the present application.

The embodiments of the present application may be applied to a network architecture shown in FIG. 2. In the network architecture, source Customer Equipment (CE) sends a FlexE client service that includes a data packet to a source Provider equipment (PE). The PE is a network node. According to the transmission rate adjustment method provided in the embodiments of the present application, the network node processes and forwards a data stream of the FlexE client service that includes the data packet, so that a terminate CE obtains the FlexE client service from a terminate PE. A reverse transmission direction of the FlexE client service is from the terminate CE to the source CE, and is reverse to the current direction. Principles are the same, and details are not described.

A data structure of a minimum unit in the embodiments of the present application may be a code block structure of a code block on which encoding processing is performed, such as a 64/66b code block, a 128/130b code block, or an 8/10b code block, or may be a structure of a byte on which encoding processing is not performed and that carries data or non-data (the non-data includes an idle byte) indication information, or a structure of a combination thereof. For a code block structure such as a 64/66b code block, a combination of types of data bytes of eight bytes that are before encoding and corresponding to the 64/66b code block is clearly indicated by a synchronization header type and a code block type of the 64/66b code block. The combination is an all-data byte combination or a non-all-data byte combination. One case of the non-all-data byte combination is that all the eight bytes are idle padding bytes before encoding, in other words, a synchronization header of the 64/66b code block is used to indicate that the code block is a data code block or a non-data code block. A combination structure of a byte on which encoding processing is not performed may be a combination of n bytes. The combination includes one byte when n is equal to 1. For example, on a 1-Gbps Ethernet GMII interface, one byte is used as a unit, and some control information is used to indicate that the byte is a data or non-data byte. Non-data bytes, also referred to as control bytes, may be classified into idle bytes or non-data bytes of other types based on actual content of the bytes. For another example, on a 10-Gbps Ethernet XGMII interface, four bytes are used as a unit, and information about four bits are used to respectively indicate types of four bytes on the XGMII. For another example, in a byte combination structure using eight bytes as a unit on a 100-GE Ethernet CGMII interface, one byte, namely, eight bits, is used to indicate a specific case in which the eight-byte combination is a data byte or non-data byte (also referred to as a control byte) combination structure. The data structure of a minimum unit is not limited in the present application. For ease of understanding, in the following embodiments, a 64/66b code block is used as a data structure unit of a minimum unit for description.

In view of this, an embodiment of the present application provides a transmission rate adjustment method and a network device based on the method. The transmission rate adjustment method includes obtaining, by a network node, a target data stream, where the target data stream includes a first data packet, and the first data packet includes at least two non-idle units, and when bandwidth adjustment needs to be performed, inserting or deleting a padding unit between any two non-idle units in a service data unit sequence stream based on a requirement and a difference between rates of a service in upstream and downstream transmission channels of the node, so that the network node performs matching on the transmission rate of the service passing from the upstream transmission channel of the node to the downstream transmission channel.

As described above, when a FlexE is used as a bearer network transmission interface, a combination of timeslots of the FlexE interface is used as a transmission channel. A plurality of transmission channels are serially connected by using nodes, to form a service end-to-end transmission channel connection. Stepped increase or decrease adjustment is usually performed to increase or decrease a bandwidth of the service end-to-end transmission channel connection, and specifically includes adjustment that a bearer network increases the bandwidth of the service end-to-end transmission channel connection and adjustment that the bearer network decreases the bandwidth of the service end-to-end transmission channel connection. The bearer network includes a plurality of network nodes, such as a start network node, an intermediate network node, and a terminate network node. When the bandwidth is increased, a bearer capability bandwidth of a downstream transmission channel of the terminate network node in the bearer network is first increased in a stepped manner, and a bearer capability bandwidth of an upstream transmission channel of the terminate network node is then increased in a stepped manner, after the terminate network node completes adjustment, service bearer capability bandwidths of upstream and downstream transmission channels on remaining network nodes in the bearer network are adjusted forward step by step, and finally, an upstream transmission channel bandwidth and a downstream transmission channel bandwidth of the service on each node in the bearer network are approximately the same, but a +/−100 ppm difference is allowed to exist. When the bandwidth is decreased, a service bearer capability bandwidth of an upstream transmission channel of the start network node in the bearer network is first decreased in a stepped manner, and a service bearer capability bandwidth of a downstream transmission channel of the start network node is then decreased, after the start network node completes adjustment, service bearer capability bandwidths of upstream and downstream transmission channels on remaining network nodes in the bearer network are adjusted backward step by step, and finally, an upstream transmission channel bandwidth and a downstream transmission channel bandwidth on each node in the bearer network are approximately the same, but a +/−100 ppm difference is allowed to exist. A downstream channel bandwidth of the service on the network node is temporarily greater than an upstream channel bandwidth in both of the foregoing two cases. When the bearer network is a whole, transmission channel bandwidths on all interfaces inside the bearer network may be adjusted through centralized control. Because times at which the network node receives a control signal vary, an upstream channel bandwidth of the service on some nodes is temporarily greater than a downstream channel bandwidth or the upstream channel bandwidth is temporarily less than the downstream channel bandwidth, and a difference between the bandwidths is relatively large. Two different cases are separately described in this embodiment of the present application.

This embodiment of the present application may be described from an aspect in which an entire bearer network adapts a difference between upstream and downstream transmission channel bandwidths of a service on each node, that is, from an end-to-end service aspect, or may be described from an aspect in which a network node in the bearer network adjusts bandwidths of transmission channels on upstream and downstream interfaces. The upstream and downstream transmission channels of the network node may be an ODUflex in an OTN interface or a timeslot combination of a FlexE flexible Ethernet interface, a native CPRI interface serving as a single transmission channel, a native Ethernet interface serving as a single transmission channel, and the like. No further example is described herein. In actual use, alternatively, a transmission channel/network interface may be an ODUk/OTN interface, a VC container/SDH interface, a conventional Ethernet (Eth), Infiniband (IB), interface bus, or fiber channel (FC) interface serving as a single transmission channel, or the like. This is not specifically limited herein.

The following provides description from two aspects. A network adjusts (increases or decreases) a bandwidth of a service end-to-end transmission channel connection, and a node performs idle addition or deletion on a service and adjusts a transmission rate of the service, to adapt to a difference between rate bandwidths of the service in upstream and downstream transmission channels on the node.

Figure 3:
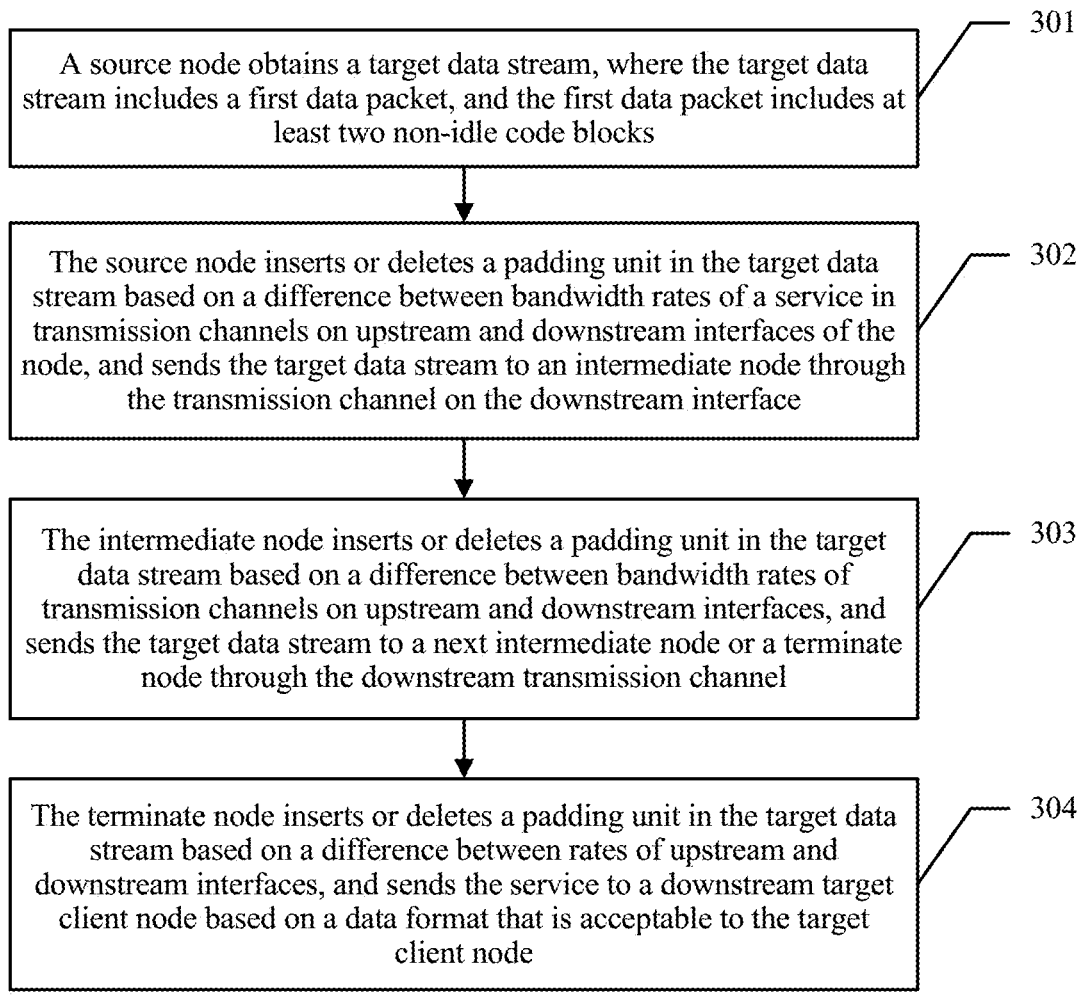
FIG. 3 is a schematic diagram of an embodiment of a transmission rate adjustment method according to an embodiment of the present application.

Referring to FIG. 3, when a service sent by a source CE to a terminate CE is transmitted in a plurality of PEs, the service may pass through one source PE, one or more intermediate PEs, and one terminate PE, to construct a transmission channel between two nodes based on a FlexE interface and a timeslot. A case in which a plurality of transmission channels are serially connected to form an end-to-end service transmission channel connection is used as an example. An embodiment of the transmission rate adjustment method in this embodiment of the present application includes the following steps.

301. A source node obtains a target data stream, where the target data stream includes a first data packet, and the first data packet includes at least two non-idle code blocks.

The source node obtains the target data stream. The target data stream includes the first data packet that carries wanted information. The service target data stream is used as a FlexE client signal in this embodiment, and is carried and transmitted on a timeslot combination that is on a FlexE interface and that is used as a transmission channel. The wanted information includes a data code block, a start code block, a terminate code block, and the like, and the data code block, the start code block, and the terminate code block are non-idle code blocks, and cannot be randomly inserted or deleted. The first data packet may include a start code block used to indicate a start of a data packet and a terminate code block used to indicate an end of the data packet. The data packet may further include a plurality of data code blocks carrying service information, and the data code blocks are located between the start code block and the terminate code block. As shown in FIG. 4, a type of the start code block may be 0x78, and there may be eight types of terminate code blocks. The eight code block types indicating an end of a packet include 0x87, 0x99, 0xAA, 0xB4, 0xCC, 0xD2, 0xE1, and 0xFF. It may be learned that the data packet may include a start code block of a 0x78 type and a terminate code block of any one of types 0x87, 0x99, 0xAA, 0xB4, 0xCC, 0xD2, 0xE1, and 0xFF.

302. The source node inserts or deletes a padding unit in the target data stream based on a difference between bandwidth rates of a service in transmission channels on upstream and downstream interfaces of the node, and sends the target data stream to an intermediate node through the transmission channel on the downstream interface.

The difference between the bandwidth rates of the upstream and downstream transmission channels of the source node may be very large. When a rate of a downstream network interface of a network node is greater than a rate of an upstream network interface of the network node and a difference between the rates of the upstream and downstream interfaces is greater than a specific threshold, for example, when a rate of a downstream transmission channel is greater than a rate of an upstream transmission channel, the network node receives the target data stream from the upstream interface, inserts a padding unit based on a rate adjustment and adaptation requirement (the difference between the rates of the upstream and downstream interfaces, namely, a difference obtained by subtracting the rate of the upstream interface from the rate of the downstream interface), and sends the target data stream to the downstream. The padding unit may be located between data code blocks in a data packet or between code blocks between data packets, and the padding unit is used to adapt and adjust the difference between the rates of the upstream and downstream interfaces of the network node. To be specific, after the padding unit is inserted, a difference between a rate of the service and a rate of the service in the transmission channel on each of the upstream and downstream interfaces of the network node is canceled, and the service can separately match the rates of the service in the transmission channels on the upstream and downstream interfaces of the node. For example, when the rate of the downstream interface is 5 Gbps greater than the rate of the upstream interface, the padding unit is inserted, so that the inserted padding unit can adapt to the difference of 5 Gbps between the rates of the service in the upstream and downstream transmission channels on the node. When the rate of the downstream network interface of the network node is less than the rate of the upstream network interface of the network node and the difference between the rates of the upstream and downstream interfaces is greater than a specific threshold, the network node receives the target data stream from the upstream interface, deletes a specific quantity of padding units to adapt to the difference between the upstream and downstream rates, and sends the target data stream to the downstream. For example, when the rate of the downstream interface is 5 Gbps less than the rate of the upstream interface, padding units of 5 Gbps are deleted, so that a data stream obtained after the deletion can adapt to the rate of the downstream interface.

It should be noted that the padding unit inserted by the source node may be a preset padding code block or a typical idle code block. The typical idle code block is a known idle data structure unit in IEEE 802.3, namely, a known idle code block or a known idle character combination, and the preset padding code block is a code block that includes an identifier field for distinguishing the code block from a known idle structure. A function of the preset padding code block may be the same as a function of the typical idle code block, and both of the code blocks may be used to perform rate adjustment. In actual application, different processing measures may be used according to different situations. In this embodiment, an example in which the known idle structure is the typical idle code block is used for description. For example, when the inserted padding unit includes both a preset padding code block and a typical idle code block, the preset padding code block is inserted between two non-idle code blocks in the data packet, and the typical idle code block is inserted between two data packets. The node may directly delete the preset padding code block, and delete the inserted typical idle code block based on a context code block, to ensure that no preset padding code block is inserted between data code blocks. A code block structure of the typical idle code block is shown in FIG. 5. A code block type of the typical idle code block may be at least any structure in the first four 0×1E code block types in FIG. 5, or may be a repeated sequence ordered set code blocks of a fifth 0×4B code block type in FIG. 5. For example, a code block structure of the preset padding code block may be any one of three code block types shown in FIG. 6, and structures of other forms are not enumerated one by one. The three code block types in FIG. 6 include a preset identifier field. The identifier field is different from a field in the typical idle code block in FIG. 5. When the inserted padding unit includes only a typical idle code block, the typical idle code block may be inserted in any location, including inserting the typical idle code block between two non-idle code blocks in the data packet or between two data packets. The inserted typical idle code block may be the first four types of known idle code blocks shown in FIG. 5 or repeated fifth-type known idle code blocks. When the deleted padding unit includes only a typical idle code block, a typical idle code block in any location may be deleted, including a typical idle code block in the data packet and a typical idle code block between data packets.

It may be understood that the bandwidth rate of the transmission channel on the downstream interface of the source node may be greater than the bandwidth rate of the transmission channel on the upstream interface of the source node. The source node inserts a specific quantity of padding units in the target data stream to compensate for the difference between the bandwidth rates of the service in the transmission channels on the upstream and downstream interfaces, so that the service can separately match the bandwidth rates of the service in the transmission channels on the upstream and downstream interfaces of the node. On the contrary, the bandwidth rate of the transmission channel on the downstream interface of the source node may be less than the bandwidth rate of the transmission channel on the upstream interface of the source node. The source node deletes a specific quantity of padding units in the target data stream to adapt to the difference between the bandwidth rates of the service in the transmission channels on the upstream and downstream interfaces, so that the service can separately match the bandwidth rates of the service in the transmission channels on the upstream and downstream interfaces of the node.

303. The intermediate node inserts or deletes a padding unit in the target data stream based on a difference between bandwidth rates of transmission channels on upstream and downstream interfaces, and sends the target data stream to a next intermediate node or a terminate node through the downstream transmission channel.

Figure 7:
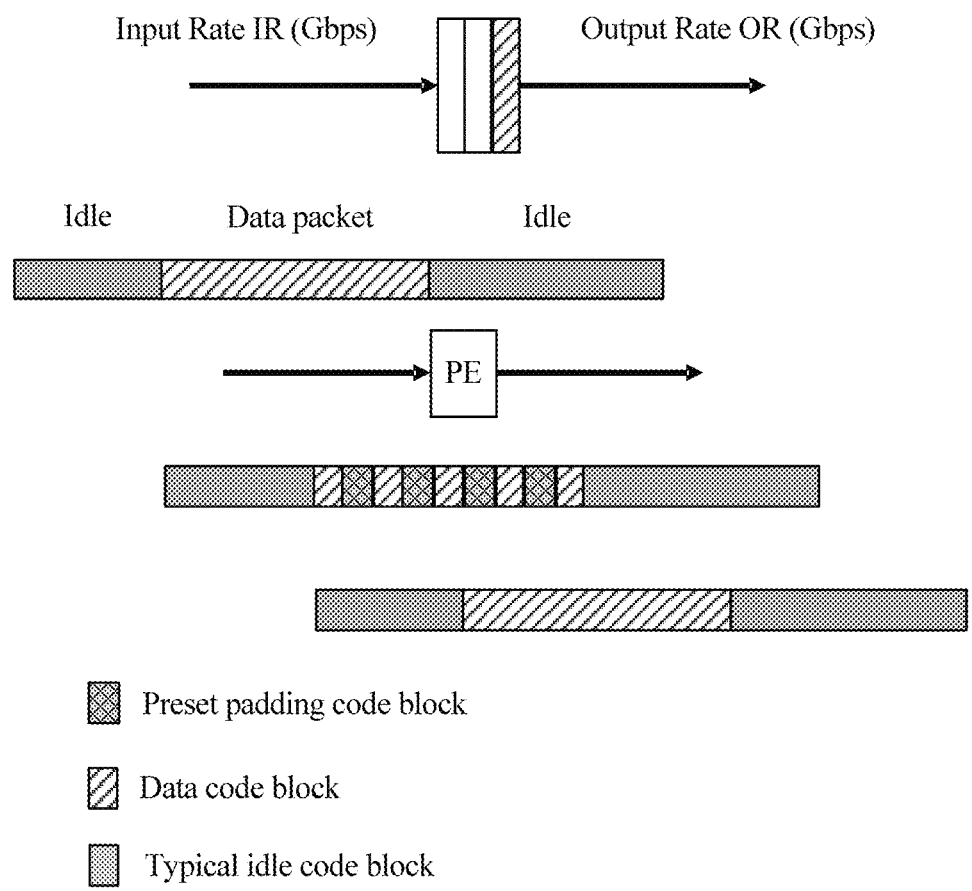
FIG. 7 is a schematic diagram of inserting a preset padding code block in a data packet according to an embodiment of the present application.
Figure 8:
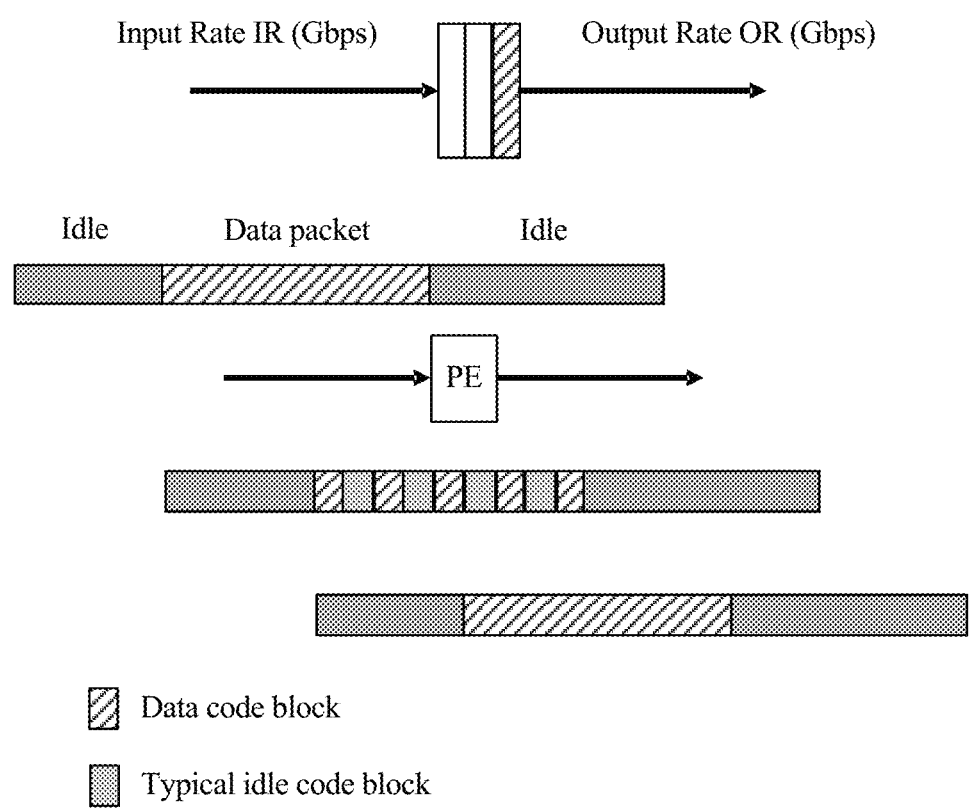
FIG. 8 is a schematic diagram of inserting a typical idle code block in a data packet according to an embodiment of the present application.

When the network node is an intermediate node, after the intermediate node obtains the target data stream from the source node or a previous intermediate node, and when a difference between bandwidth rates of transmission channels on upstream and downstream interfaces of the intermediate node is very large, a processing process of the intermediate node is similar to step 302, and details are not described herein again. When the padding unit is a preset padding code block, if the bandwidth rate of the downstream transmission channel is far greater than the bandwidth rate of the upstream transmission channel, a process in which the intermediate node inserts a preset padding code block between data code blocks is shown in FIG. 7. After receiving a data stream including a data packet, the intermediate node inserts a preset padding code block between non-idle code blocks in the data packet. When the padding unit is a typical idle code block, a process in which the intermediate node inserts a typical idle code block between non-idle code blocks is shown in FIG. 8. After receiving a data stream including a data packet, the intermediate node inserts a typical idle code block between non-idle code blocks in the data packet.

It may be understood that, when a rate of the downstream interface of the intermediate node is greater than a rate of the upstream interface of the intermediate node, the intermediate node determines, based on a sent code block type, a code block type of a padding unit that needs to be inserted. For example, when a previous sent code block type is a data code block, the intermediate node inserts a preset padding code block and sends the preset padding code block, and a specific structure of the preset padding code block is shown in FIG. 6. When a rate of the downstream interface of the intermediate node is less than a rate of the upstream interface of the intermediate node, the intermediate node deletes, based on a specific difference between the upstream and downstream rates, a deletable unit of a size the same as the difference in the target data stream. The deletable unit may be a previously inserted padding unit, or may be a previously known idle code block in the target data stream. When a previous sent code block type is a non-data code block type, the intermediate node inserts a sequence ordered set code block whose type is consistent with the previous sent code block type.

304. The terminate node inserts or deletes a padding unit in the target data stream based on a difference between rates of upstream and downstream interfaces, and sends the service to a downstream target client node based on a data format that is acceptable to the target client node.

When the network node is a terminate node, the terminate node receives the target data stream from the intermediate node. When an idle addition or deletion operation in the present application is used to adjust a transmission rate of a service, a constraint and a restriction on the data format that is acceptable to the downstream target client node need to be further considered. For example, for a 64/66b encoding CPRI service, all padding units, including preset padding code blocks or known typical idle code blocks, inserted in the target data stream need to be deleted. For another example, when the target client node can receive a service data stream only by using a conventional Ethernet interface as a single transmission channel, only an existing typical idle code block is allowed to serve as a padding unit and needs to be located between data packets. Any padding unit between non-idle code blocks in a data packet, including a preset padding code block or a known typical idle code block, needs to be removed. A padding unit between data packets is adjusted, so that the target data stream meets a requirement of a target client device for receiving service data. When the target client device has no special data format requirement and can receive an output format of the intermediate node in the present application, the terminate node may further randomly insert or delete a corresponding padding unit in the target data stream based on an actual requirement, to adapt to the difference between the bandwidth rates of the transmission channels on the upstream and downstream interfaces of the terminate node, and no special processing needs to be performed.

As described in this embodiment of the present application, after receiving the target data stream, the network node inserts or deletes the padding unit in the target data stream, and adjusts the transmission rate of the service, to adapt to the difference between the bandwidth rates of the service in the transmission channels on the upstream and downstream interfaces of the network node, and reduce a network node data buffer, a network node processing delay, and an end-to-end service transmission delay.

It should be noted that in this embodiment of the present application, as shown in FIG. 9, FIG. 9 shows byte-form control characters used when an 802.3 40-GE/100-GE service or an Ethernet service is borne on a FlexE or an Ethernet service is borne on an OTN, and characters of other services such as an FC service and an IB service are similar. An IDLE/LPI character byte is corresponding to C0 to C7 in a code block whose code block type is a 0×1E type, namely, eight consecutive idle bytes. A type of a sequence ordered set code block is 0×4B, and O0=0×0. A type of a signaling command set code block is 0×4B, and O0=0×F (which is specially used for an FC service, and is not applicable to an Ethernet service). For a data unit in a 64/66b code block form in an Ethernet service, a code block of a 0×1E type is a deletable code block. When a type of repeated sequence ordered set code blocks is 0×4B, and O0=0×0, this code block may also be deleted. For a data unit of another type, if one character byte is, for example, a minimum data unit, an addition or deletion object is an existing typical idle byte or an existing preset idle byte. Details about a data unit of another granularity are not described.

It may be understood that when the inserted padding unit includes both a preset padding code block and a typical idle code block, because the preset padding code block includes an identifier field for distinguishing the preset padding code block from a known idle structure, the terminate node may directly delete the preset padding code block, to ensure that no preset padding code block is inserted between non-idle code blocks. If the inserted padding unit does not include a preset padding code block, the terminate node deletes an inserted typical idle code block based on a context code block. To be specific, for example, when a current typical idle code block appears between a previous start code block and a next terminate code block, it is determined, based on the context code block, that the current typical idle code block is inside the data packet, and does not meet an idle requirement in an existing protocol. Therefore, the current typical idle code block needs to be deleted.

It should be noted that when a service sent by the source CE to the terminate CE is transmitted in a plurality of PEs, the service may alternatively pass through one source PE and one terminate PE (excluding an intermediate node). A processing step is similar to that in the foregoing embodiment, and details are not described herein again.

The following describes an embodiment in which a bearer network adjusts a bandwidth of an end-to-end transmission channel connection provided for a service, in other words, from an aspect of adjusting a bandwidth of an end-to-end transmission channel connection for an end-to-end service based on a requirement.

Figure 10:
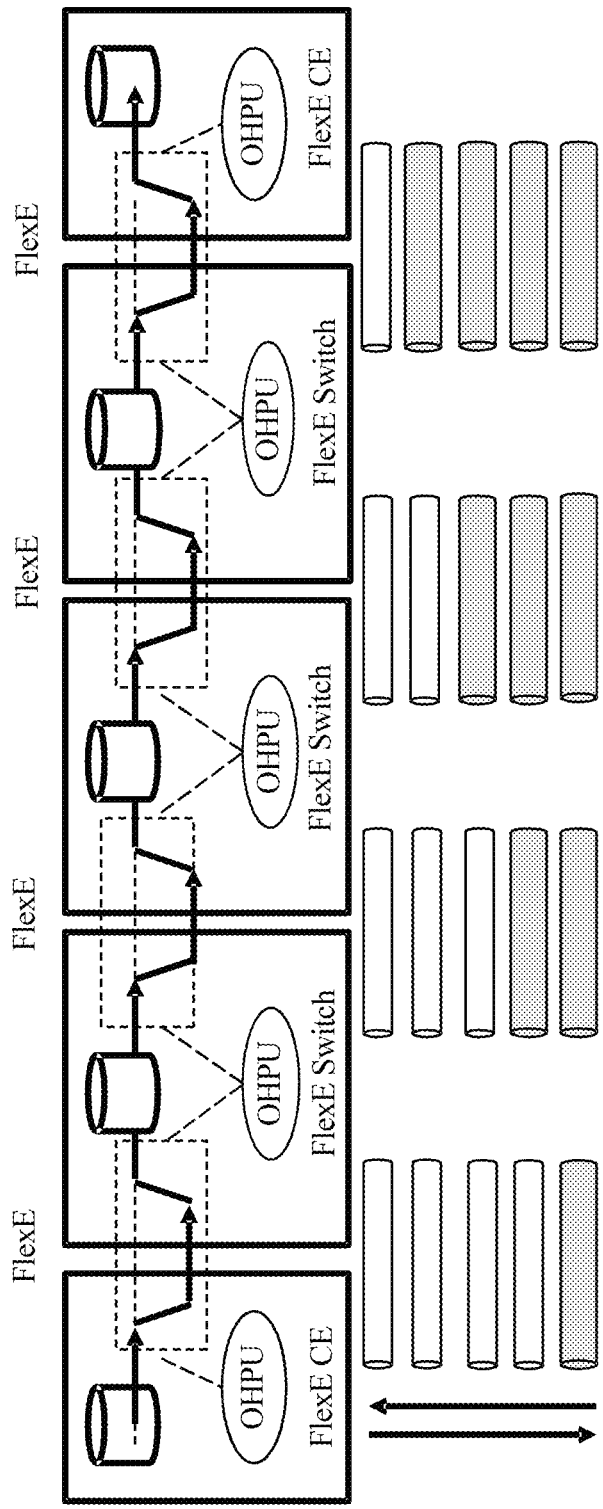
FIG. 10 is a schematic diagram of a typical end-to-end service bandwidth adjustment process according to an embodiment of the present application.

When this embodiment is applied to an OTN service and a downstream channel bandwidth of the service is temporarily greater than an upstream channel bandwidth of the service, this embodiment of the present application may be further applied to a typical process scenario of adjusting a bandwidth of an end-to-end service transmission channel connection shown in FIG. 10. The end-to-end service bandwidth adjustment may include two scenarios, a bandwidth increase and a bandwidth decrease. When bandwidth adjustment needs to be performed, each one of all network nodes between the source node and the terminate node needs to perform bandwidth adjustment negotiation with a next network node to implement the end-to-end service bandwidth adjustment hop by hop. For example, the source node initiates a bandwidth adjustment request, and forwards the bandwidth adjustment request to the downstream hop by hop. After the terminate node receives the bandwidth adjustment request and returns a bandwidth adjustment acknowledgment to the upstream, and the source node receives the bandwidth adjustment acknowledgment, it is determined that a bandwidth adjustment action can be performed.

Usually, when the bandwidth is increased, bandwidths of transmission channels are successively increased in a direction from the terminate node to the source node, namely, a direction from the downstream to the upstream. When the bandwidth is decreased, bandwidths of transmission channels are successively decreased in a direction from the source node to the terminate node, namely, a direction from the upstream to the downstream. Therefore, in a bandwidth adjustment process, a bandwidth of an upstream transmission channel may be less than a bandwidth of a downstream transmission channel, in other words, a bandwidth of a downstream transmission channel may be greater than a bandwidth of an upstream transmission channel. A problem such as a loss or an accumulation of valid packet data is not caused on the intermediate node, so that the service is lossless.

Figure 11:
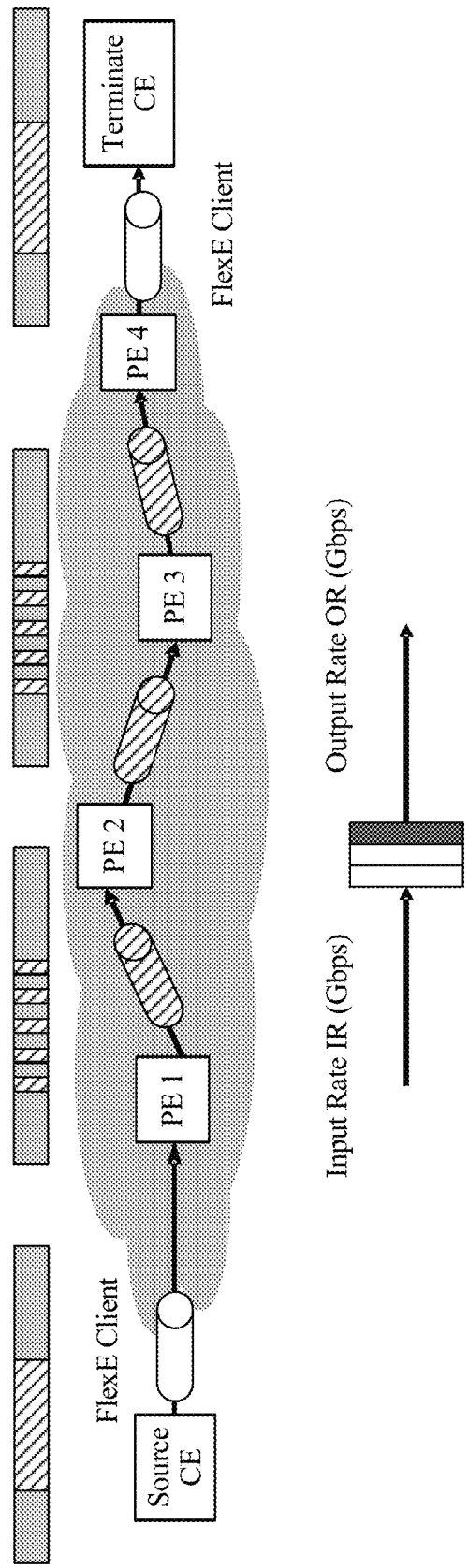
FIG. 11 is a specific application scenario of bandwidth adjustment according to an embodiment of the present application.

When the bandwidth is increased, a specific application scenario is shown in FIG. 11. It is assumed that a service bandwidth of an Ethernet service is increased from 10 Gbps to 50 Gbps, and a current Ethernet service stream bandwidth is 10 Gbps, which is equivalent to that of a conventional 10 GE. To support the Ethernet service, a bandwidth of a channel from a source CE to a PE 1 is a sum of bandwidths of two 5 Gbps timeslots in the flexible Ethernet, and a bandwidth of a channel from the PE 1 to a PE 2 is also a sum of bandwidths of two 5 Gbps timeslots in the flexible Ethernet. A bandwidth of a channel from the PE 2 to a PE 3, a bandwidth of a channel from the PE 3 to a PE 4, and a bandwidth of a channel from the PE 4 to a terminate CE are respectively a sum of bandwidths of two 5 Gbps timeslots in the flexible Ethernet. However, a small difference of +/−100 ppm may exist between upstream and downstream channel bandwidths.

The source CE first requests, by using a first hop interface, the network to increase a bandwidth of a first hop transmission channel. Specifically, currently, a management unit such as an overhead processing unit (OHPU) of the source CE may send a request by using a signaling channel of the first hop interface in the first hop transmission channel. The PE 1 device receives the request and transmits the request to the PE 2 in the downstream. The request is sequentially sent to the egress PE 4. The egress PE 4 forwards the service bandwidth increase request to the corresponding terminate CE.

After the terminate CE agrees to the increase and replies with an acknowledgement, the egress PE 4 directly adjusts a bandwidth of a last hop channel from the PE 4 to the terminate CE from two 5 Gbps timeslots to ten 5 Gbps timeslots. Therefore, stepped bandwidth adjustment is implemented on the last hop channel from the egress PE 4 to the terminate CE. In this case, for the egress PE 4, the upstream channel bandwidth of the service is 10 Gbps, the downstream channel bandwidth is 50 Gbps, and there is a relatively large difference. In this case, the egress PE 4 needs to perform rate adjustment on the service according to the method in the embodiment shown in FIG. 3. However, if the terminate CE cannot be compatible with the idle adjustment mechanism in this embodiment of the present application, the egress PE 4 needs to perform rate adjustment according to the IEEE 802.3 idle addition or deletion mechanism, in other words, an optional adjustment option is constrained by a rule. This requires a design in which the egress PE 4 supports a relatively high data buffer capability.

The egress PE 4 learns that adjustment on a terminate channel succeeds, and if there is no restriction by other factors, the egress PE 4 may reply with an acknowledgement to a bandwidth increase request from a previous node PE 3 in the upstream of the PE 4. After the acknowledgement arrives at the PE 3, the PE 3 may perform adjustment on the service channel from the PE 3 to the PE 4. The PE 3 changes a quantity of timeslots in the downstream channel of the service from 2 to 10. In this case, a channel bandwidth is changed from 10 Gbps to 50 Gbps. The egress PE 4 receives data from an upstream channel with 10 timeslots of 50 Gbps. In this case, bandwidths of both upstream and downstream service channels of the egress PE 4 are 10 timeslots of 50 Gbps. However, a small difference of +/−100 ppm may exist between the bandwidths of the upstream and downstream channels. The PE 4 may still perform rate adjustment in a manner in the embodiment shown in FIG. 3, or may perform rate adjustment according to the IEEE 802.3 idle addition or deletion mechanism. In this case, a bandwidth of an upstream channel of the PE 3 is 10 Gbps, a bandwidth of the downstream is 50 Gbps, and there is a relatively large difference. Therefore, bandwidth adjustment needs to be performed on the service according to the method in the embodiment shown in FIG. 3.

After successively adjusting a bandwidth of the last but one hop channel, if there is no restriction by other factors, the PE 3 may reply with an acknowledgement to a bandwidth increase request from a previous node PE 2 in the upstream of the PE 3. After the acknowledgement arrives at the PE 2, the PE 2 may perform adjustment on the service channel from the PE 2 to the PE 3. The PE 2 changes a quantity of timeslots in a downstream channel of the service from 2 to 10. In this case, a channel bandwidth is changed from 10 Gbps to 50 Gbps. The PE 3 receives data from the channel with 10 timeslots of 50 Gbps. In this case, bandwidths of both upstream and downstream service channels of the PE 3 are 10 timeslots of 50 Gbps. However, a small difference of +/−100 ppm may exist between the bandwidths of the upstream and downstream channels. The PE 3 may still perform rate adjustment according to the method in the embodiment shown in FIG. 3, or may perform rate adjustment according to the IEEE 802.3 idle addition or deletion mechanism. In this case, a bandwidth of an upstream channel of the PE 2 is 10 Gbps, a bandwidth of a downstream channel is 50 Gbps, and there is a relatively large difference. Therefore, bandwidth adjustment needs to be performed on the service according to the method in the embodiment shown in FIG. 3. By analogy, for an end-to-end service, bandwidth increase adjustment is implemented on channels between every two devices from downstream to upstream hop by hop.

After the ingress PE 1 learns that the bandwidth of the downstream channel is properly adjusted, the downstream channel has no bottleneck, in other words, a bottleneck only exists between the source CE and the ingress PE 1. In this case, the ingress PE 1 may reply with an acknowledgment to the bandwidth increase request from the source CE. After receiving the acknowledgment, the source CE may immediately adjust a bandwidth of a service channel from the downstream of the source CE to the egress PE 4 to 50 Gbps, to adjust a bandwidth of an end-to-end service channel based on a requirement.

It should be noted that the source CE usually sends a data packet automatically at a downstream channel bandwidth rate of the source CE. A packet is continuously sent if there is any, or a known idle structure unit is sent if there is no packet, and rate adjustment does not need to be performed even if a bandwidth of a downstream port of the source CE changes during packet sending.

When the bandwidth is decreased, a specific application scenario is shown in FIG. 11. It is assumed that a service bandwidth of an Ethernet service is decreased from 50 Gbps to 10 Gbps, and a current Ethernet service stream bandwidth is 50 Gbps, which is equivalent to that of a conventional 50 GE. To support the Ethernet service, a bandwidth of a channel from a source CE to a PE 1 is a sum of bandwidths of ten 5 Gbps timeslots in the flexible Ethernet, and a bandwidth of a channel from the PE 1 to a PE 2 is also a sum of bandwidths of ten 5 Gbps timeslots in the flexible Ethernet. A bandwidth of a channel from the PE 2 to a PE 3, a bandwidth of a channel from the PE 3 to a PE 4, and a bandwidth of a channel from the PE 4 to a terminate CE are respectively a sum of bandwidths of ten 5 Gbps timeslots in the flexible Ethernet. However, a small difference of +/−100 ppm may exist between upstream and downstream channel bandwidths.

The source CE first requests, by using a first hop interface, the network to decrease a bandwidth of a first hop transmission channel. Specifically, currently, a management unit of the source CE may send a request by using a signaling channel of the first hop interface. An ingress PE 1 device receives the request. The ingress PE 1 may reply with an acknowledgement if there is no special case.

After the PE 1 agrees to the decrease and replies with an acknowledgement, the source CE directly adjusts the bandwidth of the first hop channel from 10 timeslots to two timeslots, in other words, the bandwidth is changed from 50 Gbps to 10 Gbps. Therefore, stepped bandwidth adjustment is implemented on the first hop channel from the source CE to the ingress PE 1. It should be noted that the source CE usually sends a data packet automatically at a downstream channel bandwidth rate of the source CE. A packet is continuously sent if there is any, or a known idle structure is sent if there is no packet, and rate adjustment does not need to be performed even if a bandwidth of a downstream port of the source CE changes during packet sending. In this case, for the ingress PE 1, the upstream channel bandwidth of the service is 10 Gbps, the downstream channel bandwidth is 50 Gbps, and there is a relatively large difference. In this case, the ingress PE 1 needs to perform rate adjustment on the service according to the method in the embodiment shown in FIG. 3.

The ingress PE 1 learns that adjustment on the channel from the source CE to the ingress PE 1 succeeds. If there is no restriction by other factors, the PE 1 may send a service bandwidth decrease request to a next node PE 2. After the request arrives at the PE 2, the PE 2 may reply with an acknowledgement to the PE 1 if there is no special case.

After receiving the acknowledgement, the PE 1 performs adjustment on the downstream service channel of the PE 1. The PE 1 changes a quantity of timeslots in the downstream channel of the service from 10 to 2. In this case, a downstream channel bandwidth is changed from 50 Gbps to 10 Gbps. The PE 2 receives data from an upstream channel with 10 timeslots of 50 Gbps. In this case, bandwidths of both upstream and downstream service channels of the PE 1 are 10 timeslots of 50 Gbps. However, a small difference of +/−100 ppm may exist between the bandwidths of the upstream and downstream channels. The PE 1 may still perform rate adjustment according to the method in the embodiment shown in FIG. 3, or may perform rate adjustment according to the IEEE 802.3 idle addition or deletion mechanism. In this case, a bandwidth of an upstream channel of the PE 2 is 10 Gbps, a bandwidth of the downstream is 50 Gbps, and there is a relatively large difference. Therefore, bandwidth adjustment needs to be performed on the service according to the method in the embodiment shown in FIG. 3. By analogy, for an end-to-end service, bandwidth decrease adjustment is implemented on channels between every two devices from upstream to downstream hop by hop.

After an upstream channel bandwidth of the egress PE 4 is properly adjusted, the PE 4 may continue to request adjustment from the downstream terminate CE. However, an obvious difference exists between the upstream and downstream channels of the egress PE 4 before adjustment is performed on a last channel. Rate adjustment needs to be performed according to the method in the embodiment shown in FIG. 3. However, if the terminate CE cannot be compatible with an adjustment mechanism of the present application, the egress PE 4 needs to perform rate adjustment according to the IEEE 802.3 idle addition or deletion mechanism, in other words, there is a rule for constraint. This requires a design in which the egress PE 4 supports a relatively high data buffer capability.

Optionally, a network node, such as a conventional network device, cannot identify an inserted padding unit. The terminate CE is used as an example for description. It is assumed that the terminate CE cannot identify the padding unit in this embodiment of the present application. In this case, a last hop network device of the terminate CE, namely, the terminate PE, needs to delete all padding units in the data stream. For example, for a 64/66b encoding CPRI service, all padding units inserted in the target data stream need to be deleted, including a preset padding code block or a known typical idle code block. For example, when the target client node can receive a service data stream only by using a conventional Ethernet interface as a single transmission channel, only an existing typical idle code block is allowed to serve as a padding unit, and needs to be located between data packets.

Optionally, all existing known idle code blocks may be further deleted, and a padding unit between non-idle code blocks in the data packet, including a preset padding code block or a known typical idle code block, needs to be removed. The terminate PE may send only the data packet to the terminate CE.

When no data packet needs to be sent, the source CE may send a padding unit. The padding unit may be a preset padding code block or a typical idle code block. A data stream received by the terminate PE may include a data packet, or may include a padding unit and the like.

Optionally, in an adjustment process, each network device PE may further execute the IEEE 802.3 idle addition or deletion mechanism to implement rate adaptation.

Figure 12:
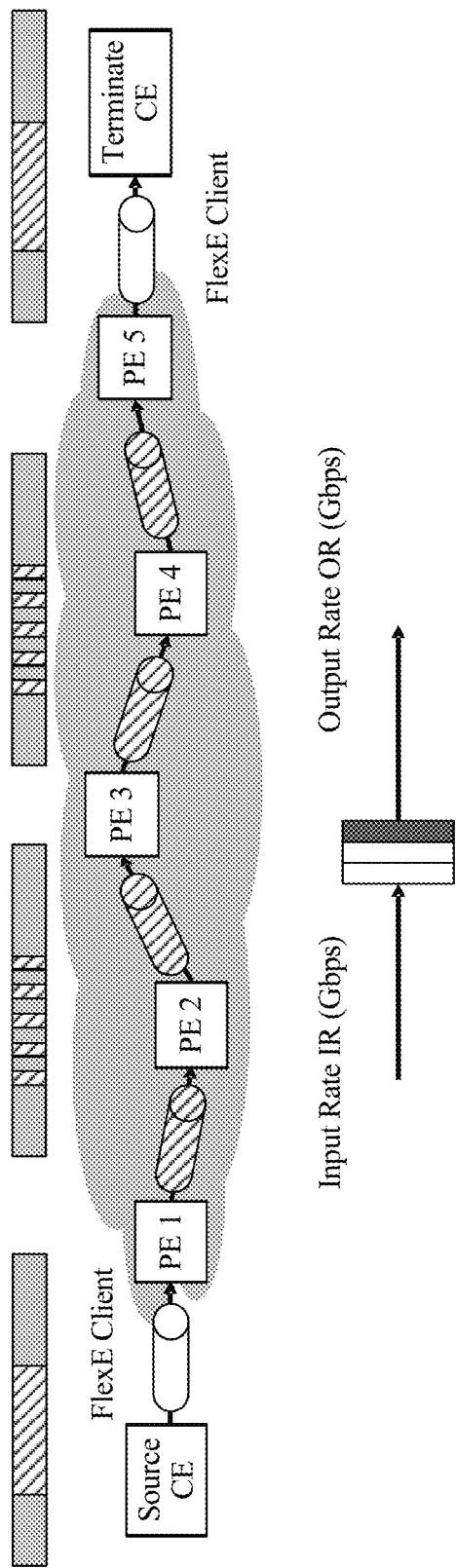
FIG. 12 is another specific application scenario of bandwidth adjustment according to an embodiment of the present application.

This embodiment is applied to an OTN, and an example in which a bandwidth of an upstream channel is temporarily greater than a bandwidth of a downstream channel is used for description. In practice, as shown in FIG. 12, when a bearer network between a source CE and a terminate CE is a whole, channel bandwidth adjustment inside the bearer network is performed through centralized control. A bandwidth request is sent from the source CE to an ingress PE interface, and the ingress PE forwards the request to a centralized controller. The centralized controller can simultaneously control channels between all PEs for separate adjustment, where the adjustment includes increasing a bandwidth and decreasing a bandwidth. Because times at which a control signal is delivered and times at which the control signal arrives at each PE vary, bandwidths of the channels between the PEs are adjusted completely out of order. In this case, for any PE, a bandwidth of a downstream channel may be greater than that of an upstream channel, or a bandwidth of an upstream channel may be greater than that of a downstream channel.

The following provides description by using an example of increasing a bandwidth. The ingress CE requests, by using the ingress PE, the network to increase a bandwidth. The ingress PE reports the request to the centralized controller of the network. Before it is ensured that a bandwidth of a channel between every two nodes in all downstream nodes is properly increased, any acknowledgment to the source CE is suspended. In other words, it is ensured that a bandwidth for sending a valid data packet from the source CE does not exceed a bandwidth of any channel before adjustment is completed.

If there is no special case, the centralized controller of the network sends an instruction to all the PEs, and a PE 1, a PE 2, a PE 3, a PE 4, and a PE 5 separately adjust a bandwidth of a corresponding downstream channel, to be specific, increase the bandwidth. This manner allows simultaneously performing adjustment on all downstream channels in parallel, and there is no need to wait for a success in adjustment on another channel. A total consumed time is relatively short. For example, a bearer network bandwidth is increased from 10 Gbps to 50 Gbps. It is assumed that a sequence of receiving an instruction is the PE 1, the PE 5, the PE 3, the PE 2, and the PE 4. In this case, an entire adjustment process has seven phases. For some network nodes, an upstream channel bandwidth may be greater than a downstream channel bandwidth. However, a bandwidth of a CE-PE 1 channel is finally increased, and valid traffic that actually enters the bearer network is constrained, so that it can be ensured that no packet data accumulation exists on a downstream intermediate node. Interface rates between different devices are shown in the following table.

|         | CE-PE 1  | PE 1-PE 2 | PE 2-PE 3 | PE 3-PE 4 | PE 4-PE 5 | PE 5-CE  |
|---------|----------|-----------|-----------|-----------|-----------|----------|
| Phase 1 | 10 Gbps  | 10 Gbps   | 10 Gbps   | 10 Gbps   | 10 Gbps   | 10 Gbps  |
| Phase 2 | 10 Gbps  | 50 Gbps   | 10 Gbps   | 10 Gbps   | 10 Gbps   | 10 Gbps  |
| Phase 3 | 10 Gbps  | 50 Gbps   | 10 Gbps   | 10 Gbps   | 10 Gbps   | 50 Gbps  |
| Phase 4 | 10 Gbps  | 50 Gbps   | 10 Gbps   | 50 Gbps   | 10 Gbps   | 50 Gbps  |
| Phase 5 | 10 Gbps  | 50 Gbps   | 50 Gbps   | 50 Gbps   | 10 Gbps   | 50 Gbps  |
| Phase 6 | 10 Gbps  | 50 Gbps   | 50 Gbps   | 50 Gbps   | 50 Gbps   | 50 Gbps  |
| Phase 7 | 50 Gbps  | 50 Gbps   | 50 Gbps   | 50 Gbps   | 50 Gbps   | 50 Gbps  |

For example, in Phase 2, only a bandwidth of the PE 1-PE 2 channel is 50 Gbps. In this case, an upstream channel bandwidth of the PE 2 is greater than a downstream channel bandwidth of the PE 2. However, valid service traffic of the source CE at a network ingress is inevitably less than 10 Gbps. In this case, the PE 1 performs rate adjustment on the service according to the method in the embodiment shown in FIG. 3, to add a large quantity of idle padding units, where a rate after the padding is 50 Gbps. The service is sent to the PE 2. The upstream channel bandwidth of the PE 2 is 50 Gbps, and the downstream channel bandwidth of the PE 2 is 10 Gbps. Rate adjustment needs to be performed by using the method in the embodiment shown in FIG. 3, to delete an excessive inserted padding unit. No valid-data accumulation is caused on any node in the bearer network provided that an ingress bandwidth of the source CE is not increased and valid service data that flows into the network is limited.

In a reverse process, if a bandwidth is decreased, an ingress channel bandwidth of the source CE is first decreased to limit valid service traffic, and then bandwidths of downstream channels are simultaneously decreased in parallel.

It should be noted that, this embodiment of the present application may be further applied to a type of service in which no idle byte exists in a service stream, including a CPRI service, an OTN service, and an SDH service.

The CPRI service has a plurality of physical interface options shown in FIG. 13.

padding code block is properly added or deleted, to adapt to the rate difference of +/−100 ppm between different channels.

It should be noted that, on a link from an egress PE to the terminate CE, when a native CPRI signal needs to be output, all padding units need to be completely deleted, and only valid CPRI data is sent based on a requirement of an original data format, in other words, an original CPRI data stream including no inserted padding unit is sent.

When the CPRI service is in an 8/10bencoding format, a CPRI line bit rate option 6, for example, may be first converted into a 64/66b code block in a same form in FIG. 13 through 8/10bencoding, and then end-to-end transmission is performed by using a 5 Gbps timeslot channel. An adjustment process is performed in the foregoing adjustment manner used when the CPRI service is in a 64/66b encoding format, and details are not described herein.

For an OTN/SDH service, OTN or SDH data usually uses a byte as a unit. Provided that one synchronization header is added to every eight bytes to obtain a 63/66b data code block through conversion, all OTN/SDH services can be converted into code block streams the following form, to be specific, only a data code block is included, and a start code block and a terminate code block do not exist. Only the adjustment manner in this embodiment of the present application can be used to perform idle adjustment on a service stream including only a data code block, and the existing IEEE 802.3 idle addition or deletion mechanism is not applicable. A code block stream of the OTN/SDH service is as follows.

| ... D D D D D D D D D D D D D D D D D ... |
|---|

When the CPRI service is in a 64/66b encoding format, for example, a rate of a CPRI line bit rate option 8 before encoding is 20×491.52 Mbit/s, and is less than a 10-GE service bandwidth. A rate difference between the two is approximately 491.52: 500. For a flexible Ethernet interface, two 5 Gbps timeslots are approximately equal to a 10-GE bandwidth. A code block stream of this CPRI rate option is as follows, and does not include any idle code block.

| D T S D D ... D D T S D D ... D D T S D D ... |
|---|

It is assumed that bandwidths of all bearer channels from end to end are approximately 10 Gbps. Even if there is a frequency difference of +/−100 ppm, overall a bandwidth of a channel is greater than a bandwidth of a CPRI. Therefore, rate adjustment (mainly including inserting a proper quantity of idle padding code blocks) needs to be performed on the ingress PE 1 according to the method in the embodiment shown in FIG. 3, and rate adjustment also needs to be performed on the PE 2, the PE 3, and the like according to the method in the embodiment shown in FIG. 3. An inserted The foregoing implements conversion from the OTN/SDH service to the code block stream, and the converted code block stream may be carried and transmitted in a channel such as a FlexE timeslot group or an OTN ODUflex. When a bandwidth of any bearer channel is greater than or equal to a net bandwidth of the code block stream of the OTN/SDH service, the network node may add or delete a padding unit in the data stream of the service based on a bandwidth of a downstream bearer channel and according to the method in this embodiment of the present application.

Alternatively, the SDH/OTN service may be converted into a data stream of another frame format such as the 64/66b encoding format with reference to an SDH/OTN frame format, and may be processed with reference to the manner of processing the foregoing CPRI service. Details are not described herein again.

Figure 14:
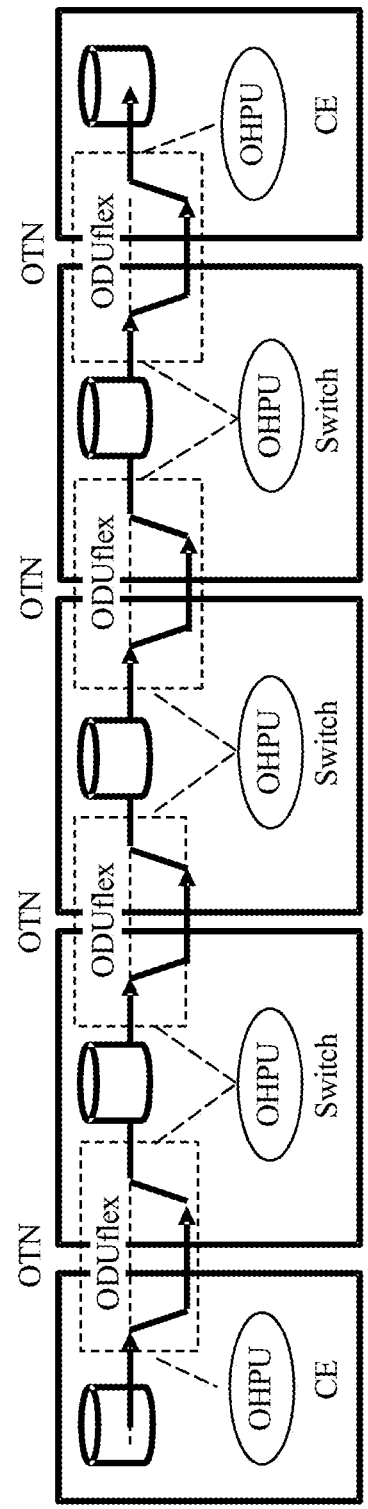
FIG. 14 is a schematic diagram of ODUflex independent networking according to an embodiment of the present application.
Figure 15:
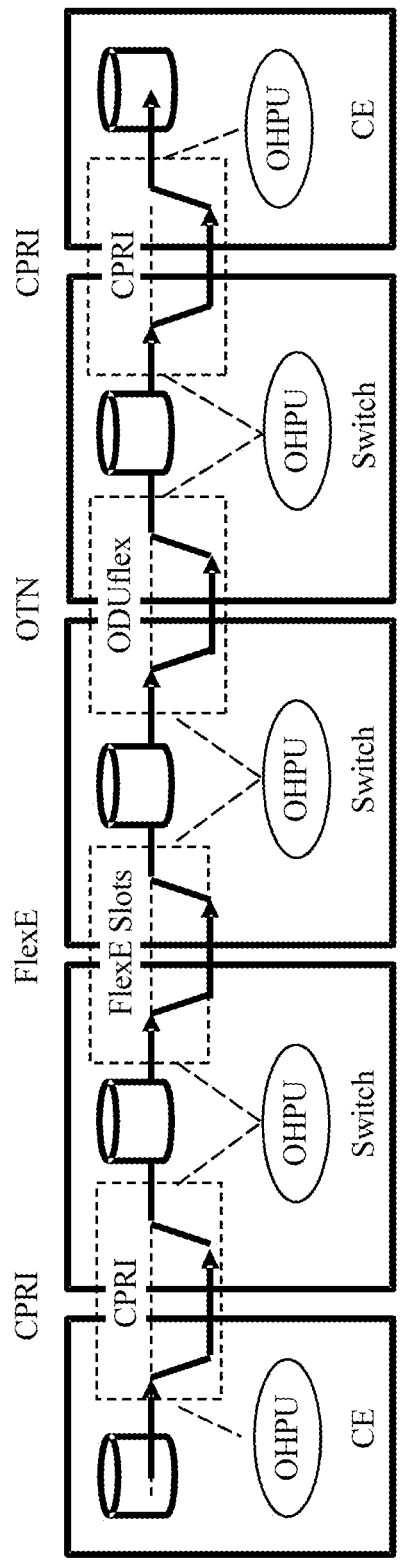
FIG. 15 is a schematic diagram of FlexE and OTN hybrid networking according to an embodiment of the present application.

For forwarding and transmission, rate adjustment and adaptation, and mapping of an OTN service from an upstream ODUflex to a downstream ODUflex, FIG. 14 shows a case in which both an upstream channel and a downstream channel of the network node are ODUflex. The ODUflex is similar to the FlexE timeslot group for bearing a service, and both are an upstream channel and a downstream channel of a service on the network node described in this embodiment of the present application, and are used as a channel between interfaces to carry a service. FIG. 14 shows a case in which all channels used for an end-to-end service are OTN ODUflex channels. The network node switches services inside the channels, and may perform rate adjustment by using the method in this embodiment of the present application, or may perform rate adjustment by using the IEEE 802.3 idle addition or deletion mechanism. After the method in the embodiment shown in FIG. 3 is used, ODUflex bandwidth adjustment can implement stepped adjustment and ensure that the service is lossless. Specifically, the ODUflex may also be a common ODUk. FIG. 15 shows FlexE and OTN hybrid networking. One network interface uses an ODUflex, and other network interfaces include a timeslot of a flexible Ethernet interface and a native CPRI interface. In actual use, alternatively, the network interface may be an ODUk/OTN interface, an SDH interface, a conventional Ethernet interface, or the like. This is not specifically limited herein.

Figure 16:
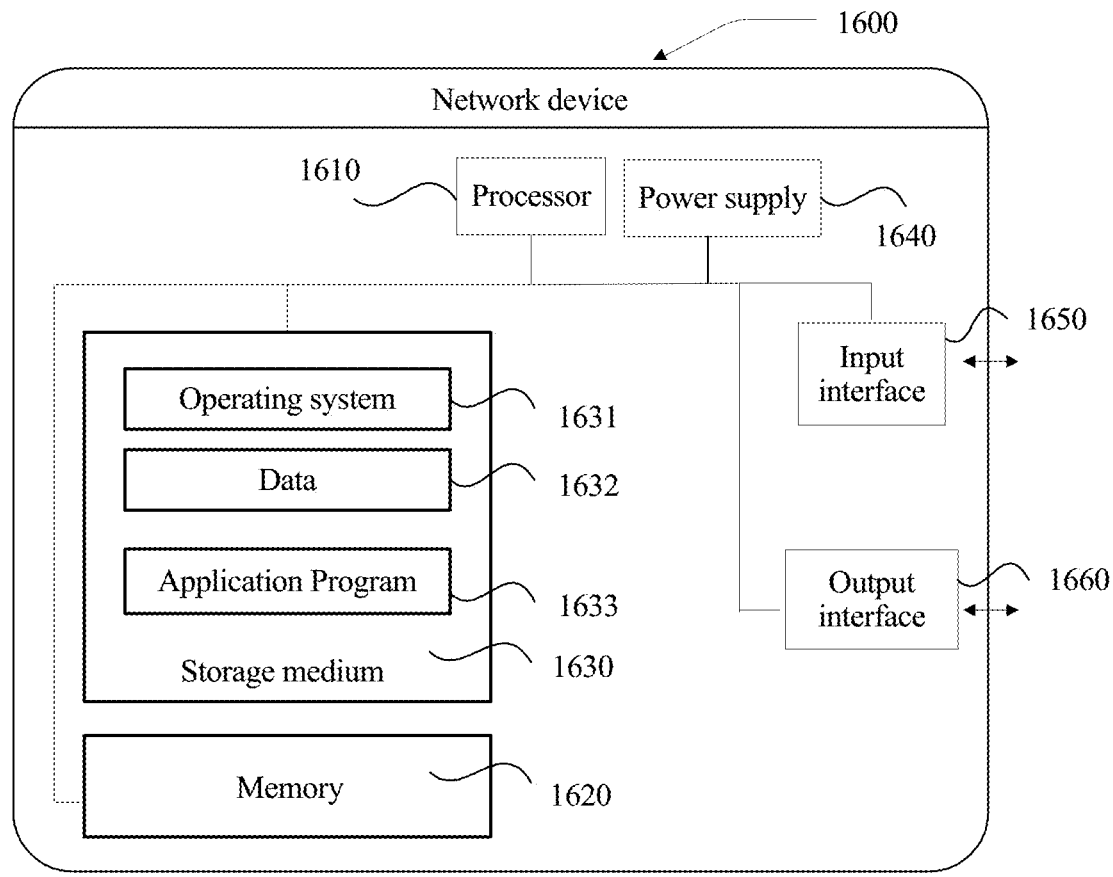
FIG. 16 is a schematic diagram of an embodiment of a network device according to an embodiment of the present application.

The transmission rate adjustment method in the embodiments of the present application is described above, and a network device in an embodiment of the present application is described below. Referring to FIG. 16, an embodiment of the network device in this embodiment of the present application includes the following.

FIG. 16 is a schematic structural diagram of a network device according to an embodiment of the present application. Relatively large differences in the network device 1600 may be generated because of configuration or performance differences. The network device 1600 may include one or more central processing unit (CPU) 1610 (for example, one or more processors), one or more memories 1620, and one or more storage media 1630 (for example, one or more mass storage devices) for storing an application program 1633 or data 1632. The memory 1620 and the storage medium 1630 may be used for temporary storage or permanent storage. The program stored in the storage medium 1630 may include one or more modules (not shown in the figure), and each module may include a series of instruction operations for a server. Further, the processor 1610 may be configured to communicate with the storage medium 1630, and perform, on the network device 1600, a series of instruction operations in the storage medium 1630. The network device 1600 may further include one or more power supplies 1640, one or more wired or wireless network interfaces 1650, one or more input/output interfaces 1660, and/or one or more operating systems 1631, such as Windows ServerTM, Mac OS XTM, UnixTM, LinuxTM, or FreeBSDTM. Persons skilled in the art may understand that a structure of the network device shown in FIG. 16 constitutes no limitation on the network device, and the network device may include more or fewer parts than those shown in the figure, or a combination of some parts, or parts disposed differently.

The following describes each constituent part of the network device in detail with reference to FIG. 16.

The memory 1620 may be configured to store a software program and a module, and the processor 1610 runs the software program and the module that are stored in the memory 1620, to perform various functional applications of the network device and data processing. The memory 1620 may mainly include a program storage area and a data storage area. The program storage area may store an operating system, an application program (such as a sound playing function or an image playing function) required by at least one function, or the like. The data storage area may store data (such as audio data or a phone book) created based on usage of the network device, or the like. In addition, the memory 1620 may include a high-speed random access memory, and may further include a non-volatile memory, for example, at least one magnetic disk storage device, a flash memory device, or another volatile solid-state storage device. A program of a rate transmission adjustment mechanism provided in this embodiment of the present application and a received data stream are stored in the memory 1620, and are invoked by the processor 1610 from the memory 1620 when the program and the data stream need to be used.

The processor 1610 is a control center of the network device, and may adjust a transmission rate according to a specified adjustment mechanism. The processor 1610 is connected to all the parts of the entire network device by using various interfaces and lines, and perform various functions of the device and data processing by running or executing the software program and/or the module that are/is stored in the memory 1620 and by invoking data stored in the memory 1620, to implement transmission rate adjustment.

Optionally, the processor 1610 may include one or more processing units.

In this embodiment of the present application, the processor 1610 is configured to perform step 301 to step 304 in FIG. 3, and details are not described herein again.

In this embodiment of the present application, the input interface 1650 and the output interface 1660 are configured to control external devices for input and output. The processor 1610 is connected to the input interface 1650 and the output interface 1660 by using an internal bus of the network device. The input interface 1650 and the output interface 1660 are separately connected to upstream and downstream external devices, to finally implement data transmission between the processor 1610 and the upstream and downstream external devices. Data can be transmitted between different devices through the input interface 1650 and the output interface 1660. An output rate of a service is rapidly adjusted to meet a requirement of changing a bandwidth based on a requirement, and a node data buffer, a node processing delay, and an end-to-end transmission delay are reduced.

Figure 17:
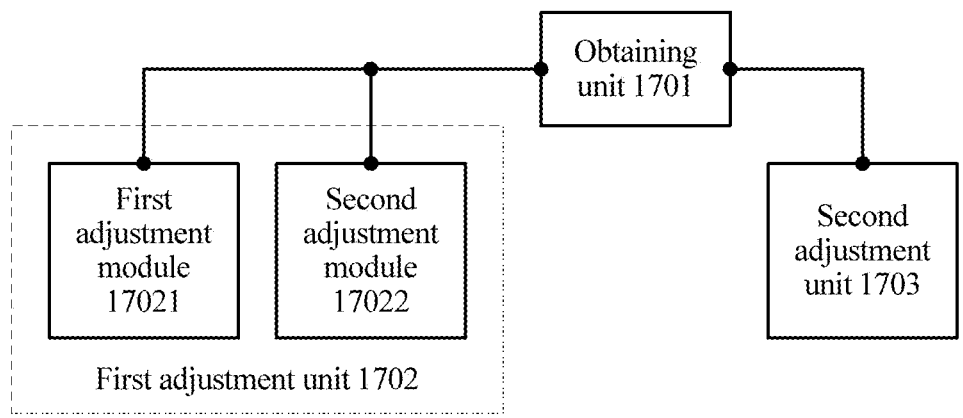
FIG. 17 is a schematic diagram of another embodiment of a network device according to an embodiment of the present application.

FIG. 16 describes in detail the network device in the embodiments of the present application from a perspective of hardware processing. The following describes in detail a network device in an embodiment of the present application from a perspective of a modular functional entity. Referring to FIG. 17, an embodiment of the network device in this embodiment of the present application includes an obtaining unit 1701, configured to obtain a target data stream, where the target data stream includes a first data packet, and the first data packet includes at least two non-idle units, and a first adjustment unit 1702, configured to when bandwidth adjustment needs to be performed, insert or delete a padding unit between any two non-idle units based on a value of the bandwidth adjustment that needs to be performed, where the padding unit is used to adapt to a difference between a bandwidth of an upstream transmission channel of the network device and a bandwidth of a downstream transmission channel of the network device.

In this embodiment of the present application, the target data stream is obtained from an upstream device by using an input interface 1650, and the target data stream is stored in a memory 1620. A processor 1610 invokes a rate adjustment program stored in the memory 1620, and sends the processed target data stream to a downstream device by using an output interface 1660, to rapidly adjust upstream and downstream rates of the network interface to adapt to a difference between upstream and downstream bandwidths of a service, and reduce a network node data buffer, a network node processing delay, and an end-to-end service transmission delay.

Optionally, the network device may further include a second adjustment unit 1703, configured to when bandwidth adjustment needs to be performed, insert or delete the padding unit between the first data packet and an adjacent data packet of the first data packet based on the value of the bandwidth adjustment that needs to be performed.

Optionally, the first adjustment unit 1702 may further include a first adjustment module 17021, configured to insert or delete a preset padding code block between any two non-idle units based on the value of the bandwidth adjustment that needs to be performed, where the preset padding code block is indicated by a code block type field, and the preset padding code block is used to adapt to the difference between the bandwidth of the upstream transmission channel of the network device and the bandwidth of the downstream transmission channel of the network device.

Optionally, the first adjustment unit 1702 may further include a second adjustment module 17022, configured to insert or delete a typical idle code block between any two non-idle units based on the value of the bandwidth adjustment that needs to be performed, where the typical idle code block is indicated by a code block type field, and the typical idle code block is used to adapt to the difference between the bandwidth of the upstream transmission channel of the network device and the bandwidth of the downstream transmission channel of the network device.

As described in this embodiment of the present application, after the network node receives the target data stream, efficient idle addition or deletion-based rate adjustment is performed on the network node based on a difference between rates of upstream and downstream transmission channels of a service data stream, to adapt to different cases of the difference between the rates of the upstream and downstream transmission channels of a service, especially a case in which there is a relatively large difference between the rates of the upstream and downstream transmission channels when rapid adjustment is performed on an end-to-end transmission bandwidth of the service. In addition, a network node data buffer, a network node processing delay, and an end-to-end service transmission delay are reduced.

Figure 18:
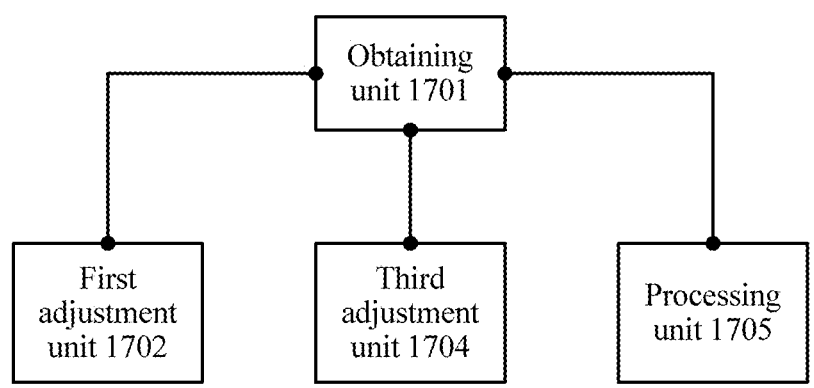
FIG. 18 is a schematic diagram of another embodiment of a network device according to an embodiment of the present application.

Referring to FIG. 18, another embodiment of a network device in an embodiment of the present application includes an obtaining unit 1701, configured to obtain a target data stream, where the target data stream includes a first data packet, and the first data packet includes at least two data units, and a first adjustment unit 1702, configured to when bandwidth adjustment needs to be performed, insert a padding unit between any two non-idle units based on a value of the bandwidth adjustment that needs to be performed, where the padding unit is used to adapt to a difference between a bandwidth of an upstream transmission channel of the network device and a bandwidth of a downstream transmission channel of the network device.

Optionally, the network device may further include a third adjustment unit 1704, configured to insert or delete a padding unit in the target data stream based on a rate difference required for rate adaptation, where the inserted or deleted padding unit is used to perform rate adaptation, and the rate difference for the rate adaptation is less than the difference between the bandwidths.

Optionally, the network device may further include a processing unit 1705, configured to delete the padding unit, and send, to a next network device or user equipment, a data unit that remains after the deletion.

As described in this embodiment of the present application, after receiving the target data stream, the network device inserts or deletes the padding unit in the target data stream based on a difference between rates of upstream and downstream transmission channels of a service data stream to rapidly adjust upstream and downstream rates of a network node, to adapt to a difference between rates of upstream and downstream transmission channels of a service. In addition, a network node data buffer, a network node processing delay, and an end-to-end service transmission delay are reduced.

It may be clearly understood by persons skilled in the art that, for the purpose of convenient and brief description, for a detailed working process of the foregoing system, apparatus, and unit, refer to a corresponding process in the foregoing method embodiments, and details are not described herein.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present application essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of the present application. The foregoing storage medium includes any medium that can store program code, such as a USB flash drive, a removable hard disk, a read-only memory (ROM), a random access memory (RAM), a magnetic disk, or an optical disc.

The foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present application.

What is claimed is:

1. A transmission rate adjustment method, comprising:
   obtaining, by a first by a first network device, from a second network device, a target data stream, wherein the target data stream comprises a first data packet, and wherein the first data packet comprises at least two non-idle units and at least one padding unit;
   determining, in response to obtaining the target data stream, whether to perform a bandwidth rate adjustment for the target data stream according to a difference between a first bandwidth rate of an upstream transmission channel of the first network device and a second bandwidth rate of a downstream transmission channel of the first network device; and
   performing, in response to determining to perform the bandwidth rate adjustment for the target data stream:
      inserting or deleting a padding unit between two non-idle units of the at least two non-idle units according the difference between the first bandwidth rate and the second bandwidth rate;
   wherein the inserting or deleting of the padding unit provides adaption to the difference between the first bandwidth rate and the second bandwidth rate; and
   wherein the first data packet, after the inserting or deleting, comprises at least two non-idle units and at least one padding unit.

2. The adjustment method according to claim 1, wherein the method further comprises:
   performing, in response to determining to perform the bandwidth rate adjustment for the target data stream:
      inserting or deleting a padding unit between the first data packet and an adjacent data packet of the first data packet.

3. The adjustment method according to claim 1, wherein the inserting or deleting the padding unit comprises:
   inserting or deleting a preset padding code block between the two non-idle units according to a value of the bandwidth rate adjustment that needs to be performed, wherein the preset padding code block is indicated by a code block type field, and wherein the inserting or deleting of the preset padding code block provides adaption to the difference between the first bandwidth rate and the second bandwidth rate.

4. The adjustment method according to claim 1, wherein the inserting or deleting the padding unit comprises:
   inserting or deleting a typical idle code block between the two non-idle units according to a value of the bandwidth rate adjustment that needs to be performed, wherein the typical idle code block is indicated by a code block type field, and wherein the inserting or deleting of the typical idle code block provides adaptation to the difference between the first bandwidth rate and the second bandwidth rate.

5. The adjustment method according to claim 1, wherein the inserting or deleting the padding unit comprises:
   inserting or deleting a padding unit in the target data stream according to a rate difference required for rate adaptation, wherein the inserted or deleted padding unit provides rate adaptation.

6. The adjustment method according to claim 1, wherein the inserting or deleting the padding unit comprises:
   deleting the padding unit; and
   sending, to a next network device or a next user equipment, a data unit that remains after the deletion.

7. The adjustment method according to claim 1,
   wherein the first network device is a terminate node; and
   wherein the inserting or deleting the padding unit comprises:
      deleting the padding unit in response to the padding unit having a type that is different than a padding unit type for a data format that is acceptable to a target client node; and
      inserting a second padding unit between two non-idle units of the at least two non-idle units, according to the data format that is acceptable to the target client node.

8. A network device, comprising:
   a bus;
   a communications interface;
   a processor; and
   a non-transitory computer-readable storage medium,
   wherein the processor is connected to the non-transitory computer-readable storage medium and the communications interface by the bus, and
   wherein the non-transitory computer-readable storage medium stores a program to be executed by the processor, the program including instructions for:
      obtaining, from another network device, a target data stream, wherein the target data stream comprises a first data packet, and wherein the first data packet comprises at least two non-idle units and at least one padding unit;
      determining, in response to obtaining the target data stream, whether to perform a bandwidth rate adjustment for the target data stream according to a difference between a first bandwidth rate of an upstream transmission channel of the network device and a second bandwidth rate of a downstream transmission channel of the network device; and
      performing, in response to determining to perform the bandwidth rate adjustment for the target data stream:
         inserting or deleting a padding unit between two non-idle units of the at least two non-idle units according to the difference between the first bandwidth rate and the second bandwidth rate;
      wherein the inserting or deleting of the padding unit provides adaption to the difference between the first bandwidth rate and the second bandwidth rate,
      wherein the first data packet after the inserting or deleting comprises at least two non-idle units and at least one padding unit.

9. The network device according to claim 8, wherein the program further include instructions for:
   performing, in response to determining to perform the bandwidth rate adjustment for the target data stream:
      inserting or deleting the padding unit between the first data packet and an adjacent data packet of the first data packet.

10. The network device according to claim 8, wherein the instructions for inserting or deleting the padding unit include instructions for:

inserting or deleting a preset padding code block between the two non-idle units according to a value of the bandwidth rate adjustment that needs to be performed, wherein the preset padding code block is indicated by a code block type field, and
wherein the inserting or deleting of the preset padding code block provides adaption to the difference between the first bandwidth rate and the second bandwidth rate.

11. The network device according to claim 8, wherein the instructions for inserting or deleting the padding unit include instructions for:
inserting or deleting a typical idle code block between the two non-idle units according to a value of the bandwidth rate adjustment that needs to be performed, wherein the typical idle code block is indicated by a code block type field, and wherein the inserting or deleting of the typical idle code block provides adaptation to the difference between the first bandwidth rate and the second bandwidth rate.

12. The network device according to claim 8, wherein the instructions for inserting or deleting the padding unit include instructions for:
inserting or deleting a padding unit in the target data stream according a rate difference required for rate adaptation, wherein the inserted or deleted padding unit provides rate adaptation.

13. The network device according to claim 8,
wherein the instructions for inserting or deleting the padding unit include instructions for:
deleting the padding unit; and
sending, to a next network device or a next user equipment, a data unit that remains after the deletion.

14. The network device according to claim 8, wherein the network device is a terminate node; and
wherein the instructions for inserting or deleting the padding unit include instructions for:
deleting the padding unit in response to the padding unit having a type that is different than a padding unit type for a data format that is acceptable to a target client node; and
inserting a second padding unit between two non-idle units of the at least two non-idle units, according to the data format that is acceptable to the target client node.

15. A non-transitory computer-readable storage medium storing a program comprising instructions which, when executed by a computer of a network device, cause the computer to perform:
obtaining, from another network device, a target data stream, wherein the target data stream comprises a first data packet, and wherein the first data packet comprises at least two non-idle units and at least one padding unit;
determining, in response to obtaining the target data stream, whether to perform a bandwidth rate adjustment for the target data stream based on a difference between a first bandwidth rate of an upstream transmission channel of the network device and a second bandwidth rate of a downstream transmission channel of the network device;
performing, in response to determining to perform the bandwidth rate adjustment for the target data stream:
inserting or deleting a padding unit between two non-idle units of the at least two non-idle units, according to the difference between the first bandwidth rate and the second bandwidth rate;
wherein the inserting or deleting of the padding unit provides adaption to the difference between the first bandwidth rate and the second bandwidth rate; and
wherein the first data packet after the inserting or deleting comprises at least two non-idle units and at least one padding unit.

16. The non-transitory computer-readable storage medium according to claim 15, wherein the program further include instructions for:
performing, in response to determining to perform the bandwidth rate adjustment for the target data stream:
inserting or deleting the padding unit between the first data packet and an adjacent data packet of the first data packet.

17. The non-transitory computer-readable storage medium according to claim 15,
wherein the instructions for inserting or deleting the padding unit include instructions for:
inserting or deleting a preset padding code block between the two non-idle units according to a value of the bandwidth rate adjustment that needs to be performed;
wherein the preset padding code block is indicated by a code block type field, and
wherein the inserting or deleting of the preset padding code block provides adaption to the difference between the first bandwidth rate and the second bandwidth rate.

18. The non-transitory computer-readable storage medium according to claim 15,
wherein the instructions for inserting or deleting the padding unit include instructions for:
inserting or deleting a typical idle code block between the two non-idle units according to a value of the bandwidth rate adjustment that needs to be performed, wherein the typical idle code block is indicated by a code block type field, and
wherein the inserting or deleting of the typical idle code block provides adaptation to the difference between the first bandwidth rate and the second bandwidth rate.

19. The non-transitory computer-readable storage medium according to claim 15,
wherein the instructions for inserting or deleting the padding unit include instructions for:
inserting or deleting a padding unit in the target data stream according a rate difference required for rate adaptation,
wherein the inserted or deleted padding unit provides rate adaptation.

20. The non-transitory computer-readable storage medium according to claim 15,
wherein the instructions for inserting or deleting the padding unit include instructions for:
deleting the padding unit; and
sending, to a next network device or a next user equipment, a data unit that remains after the deletion.

* * * * *